US012793181B2

(12) United States Patent
Zhu et al.

(10) Patent No.: US 12,793,181 B2
(45) Date of Patent: Nov. 10, 2026

(54) MODEL TRAINING METHOD AND APPARATUS FOR IMAGE PROCESSING, AND STORAGE MEDIUM AND ELECTRONIC DEVICE

(71) Applicant: BOE TECHNOLOGY GROUP CO., LTD., Beijing (CN)

(72) Inventors: Dan Zhu, Beijing (CN); Guannan Chen, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 258 days.

(21) Appl. No.: 18/694,559

(22) PCT Filed: Dec. 16, 2021

(86) PCT No.: PCT/CN2021/138923
§ 371 (c)(1),
(2) Date: Mar. 22, 2024

(87) PCT Pub. No.: WO2023/108568
PCT Pub. Date: Jun. 22, 2023

(65) Prior Publication Data
US 2024/0320863 A1 Sep. 26, 2024

(51) Int. Cl.
*G06T 5/60* (2024.01)
*G06T 3/40* (2024.01)
*G06T 7/90* (2017.01)

(52) U.S. Cl.
CPC .................. *G06T 5/60* (2024.01); *G06T 3/40* (2013.01); *G06T 7/90* (2017.01); *G06T 2207/10024* (2013.01); *G06T 2207/20081* (2013.01)

(58) Field of Classification Search
CPC .... G06T 5/60; G06T 7/90; G06T 3/40; G06T 2207/10024
See application file for complete search history.

(56) References Cited

U.S. PATENT DOCUMENTS

2016/0267382 A1 9/2016 Sullivan

FOREIGN PATENT DOCUMENTS

| | | | | |
|---|---|---|---|---|
| CN | 112562019 A | | 3/2021 | |
| CN | 113066017 A | * | 7/2021 | ............. G06N 3/045 |
| CN | 118608386 A | * | 9/2024 | ............. G06N 3/098 |

OTHER PUBLICATIONS

Hui Zeng et al., Learning Image-Adaptive 3D Lookup Tables for High Performance Photo Enhancement in Real-time, Aug. 2015, IEEE. (Year: 2015).*

(Continued)

*Primary Examiner* — Wednel Cadeau
(74) *Attorney, Agent, or Firm* — Arch & Lake LLP

(57) ABSTRACT

A model training method and apparatus for image processing are disclosed. The method includes: obtaining a picture training sample, and obtaining a ground truth picture corresponding to the picture training sample; inputting the picture training sample into a three-dimensional color look-up model to obtain a model predicted picture, and performing loss calculation on the model predicted picture and the ground truth picture to obtain a loss calculation result; and adjusting the three-dimensional color look-up model according to the loss calculation result to obtain a target image processing model. The target image processing model is configured to perform image processing on an image to be processed to obtain an image processing result corresponding to the image to be processed.

12 Claims, 18 Drawing Sheets

(56) References Cited

OTHER PUBLICATIONS

Hui Zeng et al., Learning Image-Adaptive 3D Lookup Tables for High Performance Photo Enhancement in Real-time, IEEE, 2015 (Year: 2015).*
Written Opinion of the International Searching Authority of PCT/CN2021/138923 dated Sep. 14, 2022 with English Translation, (7p).
Hui Zeng et al., "Learning Image-adaptive 3D Lookup Tables for High Performance Photo Enhancement in Real-time," IEEE Transactions on Pattern Analysis and Machine Intelligence, vol. 44, No. 4, Apr. 1, 2022, https://mp.weixin.qq.com/s/cMtSRsD_KKn1s-xYlzi9Tw, (13p).
International Search Report issued on Application No. PCT/CN2021/138923 dated Sep. 14, 2022 with English translation, (4p).

* cited by examiner

MODEL TRAINING METHOD AND APPARATUS FOR IMAGE PROCESSING, AND STORAGE MEDIUM AND ELECTRONIC DEVICE

CROSS REFERENCE TO RELATED APPLICATION

The present application is the U.S. National Stage of International Application No. PCT/CN2021/138923, filed on Dec. 16, 2021, the contents of which are incorporated herein by reference in their entireties for all purposes.

TECHNICAL FIELD

The present disclosure relates to the technical field of image processing, and in particular, to a model training method for image processing, a model training apparatus for image processing, a computer-readable storage medium and an electronic device.

BACKGROUND

With the developments of the image technical field, more needs for image processing have emerged, such as defogging images, converting blurry images into clear pictures, enhancing the exposure of images, and so on.

In related art, in the procedure of image processing, a one-dimensional color look-up model is usually used to process an image, and the one-dimensional color look-up model usually corresponds to a one-dimensional color look-up table. However, the one-dimensional color look-up table can only control single-channel color output, and individual color channels are independent of each other. In addition, the data volume of the one-dimensional color look-up table is small, and thus the one-dimensional color look-up model cannot provide highly accurate image processing results, thereby degrading user experience.

In view of this, there is an urgent need in this field to develop a new model training method and apparatus for image processing.

It should be noted that the information disclosed in the background section is only for enhancing the understanding of the background of the present disclosure, and therefore may include information that does not constitute prior art known to those of ordinary skill in the art.

SUMMARY

The objective of the present disclosure is to provide a model training method for image processing, a model training apparatus for image processing, a computer-readable storage medium and an electronic device, thereby overcoming, at least to a certain extent, the inability to provide an image processing result with high accuracy in related art.

Additional features and advantages of the present disclosure will be apparent from the following detailed description, or, in part, may be learned by practice of the present disclosure.

According to a first aspect of embodiments of the present disclosure, there is provided a model training method for image processing, including:

- obtaining a picture training sample, and obtaining a ground truth picture corresponding to the picture training sample;
- inputting the picture training sample into a three-dimensional color look-up model to obtain a model predicted picture, and performing loss calculation on the model predicted picture and the ground truth picture to obtain a loss calculation result; and
- adjusting the three-dimensional color look-up model according to the loss calculation result to obtain a target image processing model, wherein the target image processing model is configured to perform image processing on an image to be processed to obtain an image processing result corresponding to the image to be processed.

In an example embodiment of the present disclosure, the three-dimensional look-up model includes a first optimization model, the first optimization model includes a combination of one basic look-up model and a first derived model, and the first derived model includes a weight model and a plurality of basic look-up models;

- wherein inputting the picture training sample into the three-dimensional color look-up model to obtain the model predicted picture includes:
- inputting the picture training sample into the weight model to extract a picture feature corresponding to the picture training sample;
- determining weight values, which correspond to the plurality of basic look-up models in the first derived model, respectively, according to the picture feature;
- updating a plurality of basic color mapping relationships corresponding to the plurality of basic look-up models in the first derived model according to the weight values which correspond to the plurality of basic look-up models in the first derived model, respectively, and performing calculation on an update result to obtain a first derived color mapping relationship corresponding to one first derived model;
- determining a first optimization color mapping relationship corresponding to the first optimization model, based on a combination relationship corresponding to the combination of the basic look-up model and the first derived model of the first optimization model, the first derived color mapping relationship, and a basic color mapping relationship corresponding to the one basic look-up model in the first optimization model; and
- according to the first optimization color mapping relationship, determining a model predicted picture corresponding to the picture training sample.

In an example embodiment of the present disclosure, a linear combination relationship exists between the one basic look-up model and the first derived model in the first optimization model:

- wherein adjusting the three-dimensional color look-up model according to the loss calculation result to obtain the target image processing model, includes:
- if the linear combination relationship exists between the one basic look-up model and the first derived model in the first optimization model, according to the loss calculation result, adjusting the weight values which correspond to the plurality of basic look-up models in the first derived model, respectively, and the basic color mapping relationships corresponding to the basic look-up models in the first derived model, to obtain the target image processing model.

In an example embodiment of the present disclosure, a linear combination relationship exists between the one basic look-up model and the first derived model in the first optimization model. Adjusting the three-dimensional color look-up model according to the loss calculation result to obtain the target image processing model, includes: if the linear combination relationship exists between the one basic look-up model and the first derived model in the first optimization model, according to the loss calculation result, adjusting the weight values and basic color mapping relationships corresponding to the basic look-up models in the first derived model to obtain a model training result.

In an example embodiment of the present disclosure, a product combination relationship exists between the one basic look-up model and the first derived model in the first optimization model:

wherein adjusting the three-dimensional color look-up model according to the loss calculation result to obtain the target image processing model, includes:

if the product combination relationship exists between the one basic look-up model and the first derived model in the first optimization model, adjusting the weight values which correspond to the plurality of basic look-up models in the first derived model, respectively, and a plurality of basic color mapping relationships corresponding to the plurality of basic look-up models in the first derived model, to obtain a training result corresponding to the first derived model; and when the training result meets a training end condition, training the first optimization model according to the loss calculation result to obtain the target image processing model.

In an example embodiment of the present disclosure, the weight model includes a picture size fixing layer, a plurality of sampling layers and an output layer which are connected in order, the picture size fixing layer is used to fix a size of the picture training sample, the sampling layers are used to extract the picture feature corresponding to the picture training sample, and the output layer is used to determine, according to the picture feature, the weight values which correspond to the plurality of basic look-up models in the first derived model, respectively.

In an example embodiment of the present disclosure, the three-dimensional color look-up model includes a combined model, and the combined model includes two first optimization models; wherein a combination relationship of one of the first optimization models in the combined model is a linear combination relationship, and a combination relationship of the other one of the first optimization models in the combined model is a product combination relationship.

In an example embodiment of the present disclosure, the three-dimensional color look-up model includes a second optimization model, and the second optimization model includes a combination of a plurality of second derived models and one basic look-up model:

wherein inputting the picture training sample into the three-dimensional color look-up model to obtain the model predicted picture includes:

inputting the picture training sample into the plurality of second derived models to extract a picture feature corresponding to the picture training sample;

according to the picture feature, determining a second derived color mapping relationship between a pixel color value in the picture training sample and a target pixel color value;

based on a combination relationship corresponding to the combination of the plurality of second derived models and the basic look-up model, a plurality of second derived color mapping relationships corresponding to the plurality of second derived models and a basic color mapping relationship corresponding to the basic look-up model, determining a second optimization color mapping relationship corresponding to the second optimization model; and according to the second optimization color mapping relationship, determining a model predicted picture corresponding to the picture training sample.

In an example embodiment of the present disclosure, the three-dimensional color look-up model includes a combined model, and the combined model includes two second optimization models; wherein one of the second optimization models in the combined model has a linear combination relationship, and the other one of the second optimization models in the combined model has a product combination relationship.

In an example embodiment of the present disclosure, the combined model includes a combination of one first optimization model and one second optimization model, the first optimization model includes one basic look-up model and a first derived model, and the first derived model includes a weight model and a plurality of basic look-up models;

wherein the method further includes:

if the first optimization model is a linear combined model of the one basic look-up model and the first derived model, the second optimization model being a product combined model of the one basic look-up model and a plurality of second derived models; and if the first optimization model is a product combined model of the one basic look-up model and the first derived model, the second optimization model being a linear combined model of the one basic look-up model and the plurality of second derived models.

In an example embodiment of the present disclosure, a linear combination relationship exists between the one basic look-up model and the plurality of second derived models in the second optimization model;

wherein adjusting the three-dimensional color look-up model according to the loss calculation result to obtain the target image processing model, includes:

adjusting the second derived color mapping relationships according to the loss calculation result to obtain the target image processing model.

In an example embodiment of the present disclosure, a product combination relationship exists between the one basic look-up model and the second derived models in the second optimization model;

wherein adjusting the three-dimensional color look-up model according to the loss calculation result to obtain the target image processing model, includes:

adjusting the second derived color mapping relationships according to the loss calculation result to obtain a training result corresponding to the second derived models; and if the training result meets a training end condition, training the second optimization model according to the loss calculation result to obtain the target image processing model.

In an example embodiment of the present disclosure, the second derived model includes a picture size fixing layer, a matrix transformation layer, a plurality of sampling layers and an output layer which are connected in order, the picture size fixing layer is used to fix a size of the picture training sample, the matrix transformation layer is used to transform a matrix output by the picture size fixing layer, the sampling layers are used to extract the picture feature corresponding to the picture training sample, and the output layer is used to output the second derived color mapping relationship corresponding to the picture feature.

In an example embodiment of the present disclosure, the three-dimensional color look-up model includes one third optimization model or a plurality of third optimization models, and the third optimization models are any one of the basic look-up model, the first optimization model, the second optimization model and the combined model, the first optimization model includes a combination of one basic look-up model and a first derived model, the first derived model includes a weight model and a plurality of basic look-up models, and the second optimization model includes a combination of a plurality of second derived models and one basic look-up model;

wherein inputting the picture training sample into the three-dimensional color look-up model to obtain the model predicted picture, includes:

obtain a plurality of down-sampling factors, and sampling the picture training sample according to the plurality of down-sampling factors to obtain a plurality of down-sampling results, wherein the down-sampling factors include integer factors;

determining at least one up-sampling factor according to a picture processing requirement, and sampling the picture training sample according to the at least one up-sampling factor to obtain at least one up-sampling result, wherein the at least one up-sampling factor includes a decimal factor;

inputting the down-sampling results into the one third optimization model or the plurality of third optimization models to obtain first model output results corresponding to the down-sampling results;

inputting the at least one up-sampling result into the one third optimization model or the plurality of third optimization models to obtain a second model output corresponding to the at least one up-sampling result;

comparing a magnitude of the at least one up-sampling factor to obtain a first factor comparison result, and comparing magnitudes of the down-sampling factors to obtain a second factor comparison result; and based on the first factor comparison result and the second factor comparison result, determining an input-output relationship between the first model output results and the second model output result, so as to obtain the model predicted picture based on the input-output relationship.

In an example embodiment of the present disclosure, the method further includes:

inputting the picture training sample into a model to be learned to obtain a ground truth picture corresponding to the picture training sample, wherein the model to be learned includes any one of the basic look-up model, the first optimization model, the second optimization model, the third optimization model and an open source model;

inputting the picture training sample into a target optimization model to obtain the model predicted picture, wherein the target optimization model includes any one of the basic look-up model, the first optimization model, the second optimization model and the combined model; and performing loss calculation on the model predicted picture and the ground truth picture to adjust the target optimization model according to a loss calculation result to obtain the target optimization model with a same function as the model to be learned.

In an example embodiment of the present disclosure, the three-dimensional color look-up model includes a basic look-up model;

wherein inputting the picture training sample into the three-dimensional color look-up model to obtain the model predicted picture, includes:

inputting the picture training sample into the basic look-up model, wherein the basic look-up model is used to determine a pixel color value in the picture training sample, and determine a target pixel color value that has a basic color mapping relationship with the pixel color value; and determining a target pixel corresponding to the target pixel color value, and determining a picture formed by the target pixel as the model predicted picture.

According to a second aspect of embodiments of the present disclosure, there is provided a model training apparatus for picture processing, including:

an obtaining module configured to obtain a picture training sample, and obtain a ground truth picture corresponding to the picture training sample;

a loss calculation module configured to input the picture training sample into a three-dimensional color look-up model to obtain a model predicted picture, and perform loss calculation on the model predicted picture and the ground truth picture to obtain a loss calculation result; and an adjustment module configured to adjust the three-dimensional color look-up model according to the loss calculation result to obtain a target image processing model, wherein the target image processing model is configured to perform image processing on an image to be processed to obtain an image processing result corresponding to the image to be processed.

According to a third aspect of embodiments of the present disclosure, there is provided an electronic device, including: a processor; and a memory. The memory has computer-readable instructions stored thereon. When the computer-readable instructions are executed by the processor, the model training method for image processing according to any one of the above example embodiments is implemented.

According to a fifth aspect of embodiments of the present disclosure, there is provided a computer readable storage medium on which a computer program is stored. When the computer program is executed by a processor, the model training method for image processing according to any one of the above example embodiments is implemented.

According to a fifth aspect of embodiments of the present disclosure, there is provided an image processing method, including: obtaining an image to be processed and an image processing requirement; and inputting the image to be processed and the image processing requirement into the target image processing model in the above methods, to obtain an image processing result.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the specification, illustrate embodiments consistent with the present disclosure and together with the specification serve to explain the principles of the present disclosure. Apparently, the drawings in the following description are only some embodiments of the present disclosure, and those skilled in the art may obtain other drawings according to these drawings without creative efforts.

DETAILED DESCRIPTION

Figure 1:
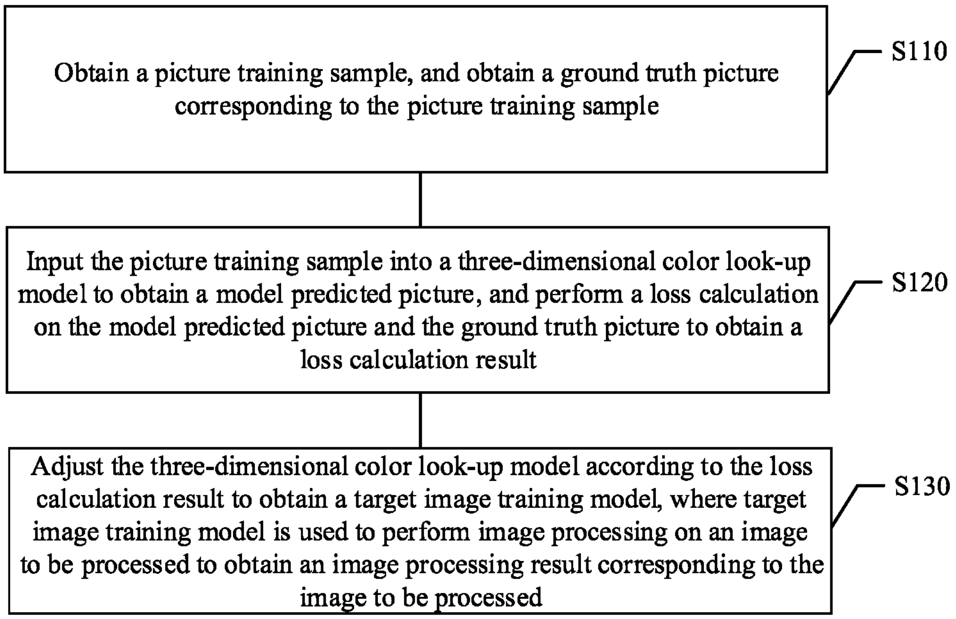
FIG. 1 schematically shows a flow chart of a model training method for image processing in an embodiment of the present disclosure.

Example implementations will now be described more fully with reference to the accompanying drawings. Example implementations may, however, be embodied in many forms and should not be construed as being limited to the implementations set forth herein; rather, these implementations are provided so that the present disclosure will be thorough and complete, and will fully convey the concept of example implementations to those skilled in the art. The described features, structures or characteristics may be combined in any suitable manner in one or more implementations. In the following description, numerous specific details are provided to give a thorough understanding of implementations of the present disclosure. However, those skilled in the art will appreciate that the technical solutions of the present disclosure may be practiced without one or more of the specific details described, or other methods, components, devices, steps, etc. may be adopted. In other situations, well-known technical solutions have not been shown or described in detail to avoid obscuring aspects of the present disclosure.

The words “one”, “a/an”, “the”, and “said” are used in the specification to indicate the presence of one or more elements/components/etc.; the terms “comprising/comprises/comprise” and “having/has/have” are used to indicate an open-ended inclusive, and means that there may be additional elements/components/etc. in addition to the listed elements/components/etc. The words “first” and “second” are used as markers only, but are not used to limit the number of objects.

Furthermore, the drawings are merely schematic illustrations of the present disclosure and are not necessarily drawn to scale. The same reference numerals in the drawings represent the same or similar parts, and thus their repeated description will be omitted. Some of the block diagrams shown in the drawings are functional entities and do not necessarily correspond to physically or logically separate entities.

In view of the problem(s) existing in related art, the present disclosure proposes a model training method for image processing. FIG. 1 shows a schematic flow chart of a model training method for image processing. As shown in FIG. 1, the model training method for image processing at least includes the following steps:

In step S110, a picture training sample is obtained, and a ground truth picture corresponding to the picture training sample is obtained.

In step S120, the picture training sample is input into a three-dimensional color look-up model to obtain a model predicted picture, and a loss calculation is performed on the model predicted picture and the ground truth picture to obtain a loss calculation result.

In step S130, the three-dimensional color look-up model is adjusted according to the loss calculation result to obtain a target image training model. The target image training model is used to perform image processing on an image to be processed to obtain an image processing result corresponding to the image to be processed.

In the methods and apparatuses provided by example embodiments of the present disclosure, on the one hand, the target image processing model is the result of training the three-dimensional color look-up model. This can avoid the situation as in the related art where the image processing result is based on a one-dimensional color look-up table, and thus the accuracy of the image processing result can be ensured. On the other hand, since the three-dimensional color look-up model is three-dimensional, the three-dimensional color look-up model has a larger data capacity than the one-dimensional color look-up table in the related art. Thus, the present disclosure can meet different image processing needs and expand the application scenario of image processing.

Steps in the model training method for image processing will be explained in detail below.

In step S110, the picture training sample is obtained, and the ground truth picture corresponding to the picture training sample is obtained.

In an example embodiment of the present disclosure, the picture training sample refers to a sample picture for training the subsequent three-dimensional color look-up model. It should be noted that the picture training samples need to be complex and diverse enough. Specifically, the picture training samples may include pictures of various brightness, or the picture training samples may be pictures of various contents, or the picture training samples may be pictures of individual frames in various videos, which are not specifically limited in the example embodiment. The ground truth picture is also a picture used to train the three-dimensional color look-up model. There is a one-to-one correspondence between a ground truth picture and a picture training sample. Moreover, the ground truth picture is a picture obtained after repairing a problem existing in the picture training sample. For example, the picture training sample is a blurred image of scene A, and the ground truth picture is a clear image of scene A obtained by clarifying the image of scene A.

For example, 10000 picture training samples are obtained. Among the 10000 picture training samples, 5000 picture training samples are pictures, and the other 5000 picture training samples are pictures of individual frames in videos. Correspondingly, 10000 ground truth pictures are obtained, and there is a one-to-one correspondence between 10000 ground truth pictures and 10000 picture training samples.

In the example embodiment, obtaining the picture training samples and the ground truth pictures corresponding to the picture training samples can ensure the subsequent training of the three-dimensional color look-up model, so as to ensure that an accurate three-dimensional color look-up model is trained, thereby improving accuracy of the image processing result.

In step S120, the picture training sample is input into the three-dimensional color look-up model to obtain the model predicted picture, and the loss calculation is performed on the model predicted picture and the ground truth picture to obtain the loss calculation result.

In an example embodiment of the present disclosure, the model predicted picture is a result obtained by inputting the picture training sample to the three-dimensional color look-up model.

For one picture, the color value of each pixel in the picture has three color channels. Specifically, the three color channels are a red channel, a green channel and a blue channel. The three-dimensional color look-up model refers to a model formed by a three-dimensional color look-up table. The three-dimensional color look-up table refers to a color look-up table related to the three color channels.

It should be noted that since the three-dimensional color look-up table is related to the three color channels, the output result of the three-dimensional color look-up table is jointly affected by values of the three color channels. In addition, the three-dimensional color look-up table has a huge capacity. For example, a 64-order three-dimensional look-up table has 260,000 color output values. And, since the three-dimensional color look-up table is essentially a numerical matrix, the procedure of using the three-dimensional color look-up table to calculate the output color is a differentiable and derivable procedure, and thus a three-dimensional color look-up model can be created based on the three-dimensional color look-up table.

After inputting a picture training sample into the three-dimensional color look-up model to obtain a model predicted picture, a loss calculation result may be obtained by performing a loss calculation on the model predicted picture and the ground truth picture. Specifically, the loss calculation procedure may be performing a calculation using a mean absolute deviation formula, or may be performing a calculation using an average loss function, or may be performing a calculation using a mean square loss function, or may be performing a calculation using a color-related loss function, or may be performing a calculation carried out with a smoothing loss function, or may be a calculation using a perceptual loss function, which is not specifically limited in the example embodiment. It is to be noted that the specific loss function to be used for loss calculation needs to be determined according to a specific picture processing requirement. For example, the picture requirement is to obtain a picture processing result in which the color is restored. In this case, a color-related loss function may be used to perform a loss calculation.

Figure 2:
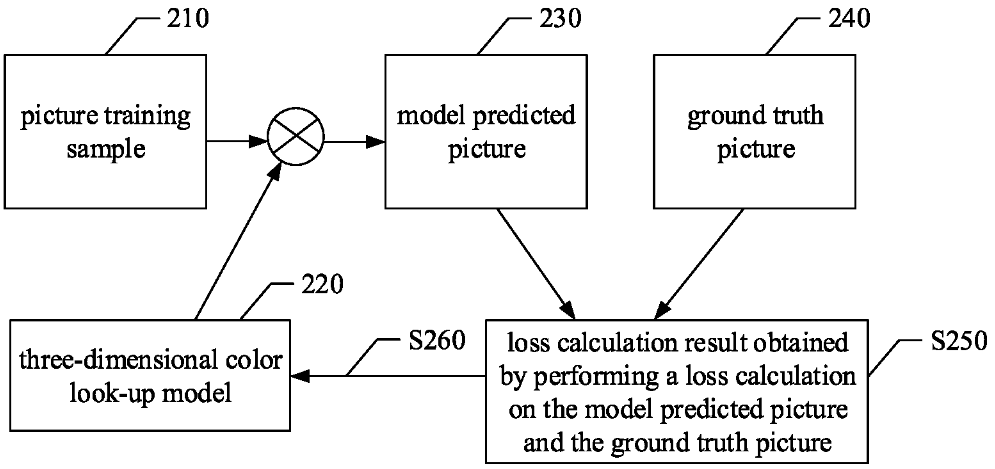
FIG. 2 schematically shows a structural diagram of a three-dimensional color look-up model in an embodiment of the present disclosure.

For example, as shown in FIG. 2, a picture 210 is a picture training sample, model 220 is a three-dimensional color look-up model, picture 230 is a model predicted picture, a picture 240 is a ground truth picture, and a result 250 is a loss calculation result. Specifically, the loss calculation result is obtained by performing a loss calculation on the model predicted picture and the ground truth picture. After obtaining the loss calculation result, parameter(s) in the three-dimensional color look-up model is(are) adjusted according to the loss calculation result to obtain a target picture training model.

Figure 3:
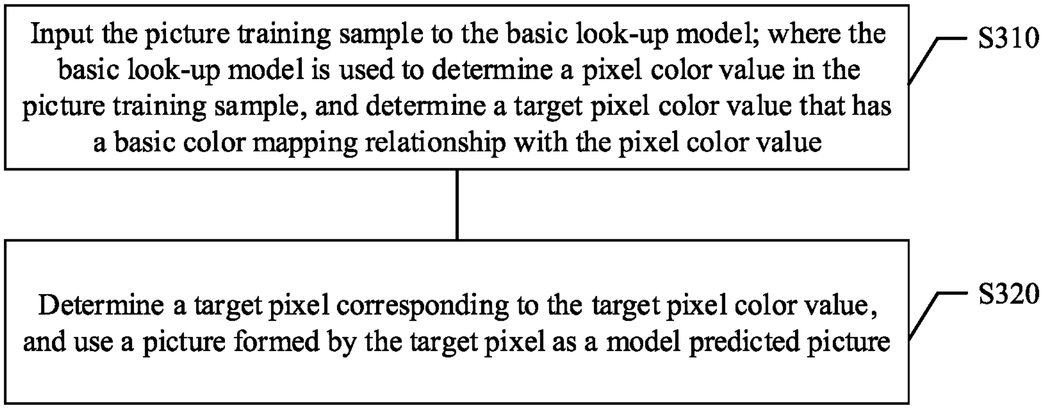
FIG. 3 schematically shows a flow chart for obtaining a model predicted picture in an embodiment of the present disclosure.

In an optional embodiment, FIG. 3 shows a schematic flow chart of obtaining a model predicted picture in a model training method for image processing. The three-dimensional color look-up model includes a basic look-up model. As shown in FIG. 3, the method at least includes the following steps. In step S310, the picture training sample is input to the basic look-up model; where the basic look-up model is used to determine a pixel color value in the picture training sample, and determine a target pixel color value that has a basic color mapping relationship with the pixel color value.

Specifically, the three-dimensional color look-up model may be a basic look-up model, that is, a model formed directly using a three-dimensional color look-up table. Specifically, the basic look-up model may be as shown by 220 in FIG. 2.

When the picture training sample is input to the basic look-up model, first, the basic look-up model determines the pixel color value corresponding to the picture training sample, that is, determines values of three color channels for each pixel in the picture training sample. Then, based on a basic color mapping relationship, the target pixel color value corresponding to the pixel color value is determined.

Specifically, the basic color mapping relationship is as shown in formula (1) and formula (2).

$$U = \{\mu^c_{(i,j,k)} | i, j, k = 0, 1, 2, \ldots, N, c \in \{r, g, b\}\} \quad (1)$$

$$\{O^c_{(i,j,k)} | c \in \{r, g, b\}\} = \mu^c_{(i,j,k)}\{I^r_{(i,j,k}, I^g_{(i,j,k)}, I^b_{(i,j,k)}\} \quad (2)$$

where i, j, k respectively correspond to spatial system coordinates of three color channels of a pixel in the picture training sample. Based on this, $$I^r_{(i,j,k)}, I^g_{(i,j,k)}, I^b_{(i,j,k)}$$

represent values of the three color channels of the pixel at the spatial coordinate (i, j, k), N is the maximum value that i, j, k can take, and c represents three color channels. Specifically, r represents the red channel, g represents the green channel, and b represents the blue channel, $$\mu^c_{(i,j,k)}$$

is the basic color mapping relationship, and $$O^c_{(i,j,k)}$$

represents a target pixel color value corresponding to three channel color values of a certain pixel in the picture training sample based on the basic color mapping relationship.

For example, a picture training sample is input into the basic look-up model as shown by model 220 in FIG. 2. The basic look-up model determines the pixel color value of each pixel in the picture training sample, that is, three channel color values of each pixel. Then, the target pixel color value corresponding to the pixel color value is determined based on the basic color mapping relationship as shown in formula (2).

In step S320, a target pixel corresponding to the target pixel color value is determined, and a picture formed by the target pixel is used as a model predicted picture.

After determining the target pixel color value, a target pixel having the target pixel color value is determined, and a picture composed of the target pixel is used as a model predicted picture.

For example, there are 1000 pixels in a picture training sample. After determining 1000 target pixel color values that have a basic color mapping relationship with the pixel color values of the 1000 pixels, target pixels having the 1000 target pixel values are determined, and a picture composed of the 1000 target pixels is used as the model predicted picture.

In an example embodiment, the basic look-up model is one kind of three-dimensional color look-up model. Inputting the picture training sample to the basic look-up model lays the foundation for subsequently obtaining a model training result and ensures that a picture processing result with high accuracy can be subsequently obtained.

Figure 4:
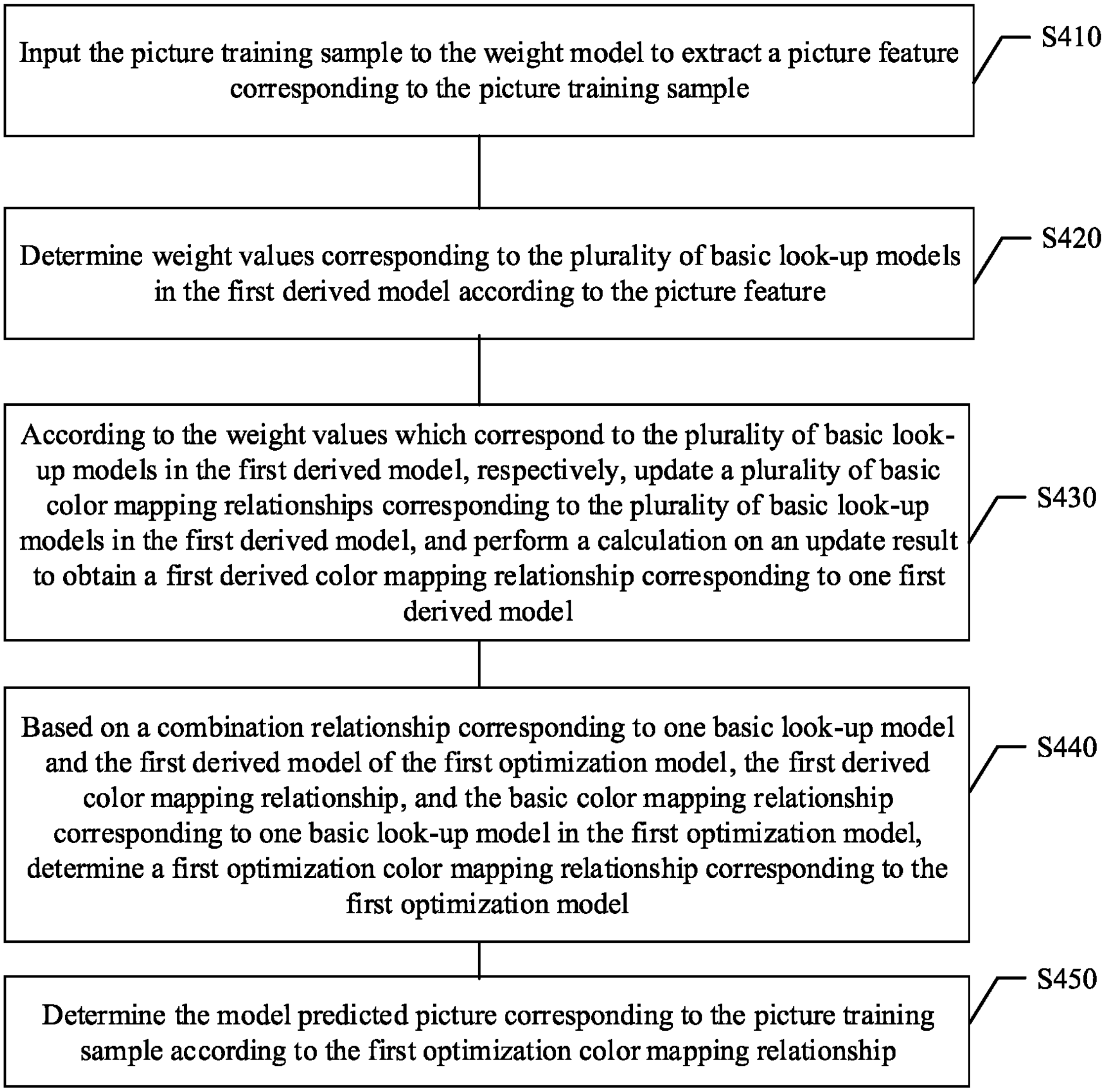
FIG. 4 schematically shows a flow chart for obtaining a model predicted picture in an embodiment of the present disclosure.

In an optional embodiment, FIG. 4 shows a schematic flow chart of obtaining a model predicted picture in a model training method for image processing. The three-dimensional look-up model includes a first optimization model. The first optimization model includes a combination of one basic look-up model and a first derived model. The first derived model includes a weight model and a plurality of basic look-up models. As shown in FIG. 4, the method at least includes the following steps. In step S410, the picture training sample is input to the weight model to extract a picture feature corresponding to the picture training sample.

The three-dimensional look-up model may be a first optimization model, and the first optimization model includes a combination of one basic look-up model and a first derived model. Specifically, it may be a linear combination of one basic look-up model and a first derived model, or it may be a product combination of one basic look-up model and a first derived model, which is not particularly limited in the example embodiment.

The first derived model includes a plurality of basic look-up models and a weight model, where the weight model is used to assign weights to the plurality of basic look-up models in the first derived model.

In this case, a picture training sample is input to the weight model, and the weight model extracts a picture feature of the picture training sample. The picture feature may be a content feature of the picture, may be a texture feature of the picture, may be a color feature of the picture, or may be any kind of features of the picture, and the example embodiment does not specifically limit this.

Figure 5:
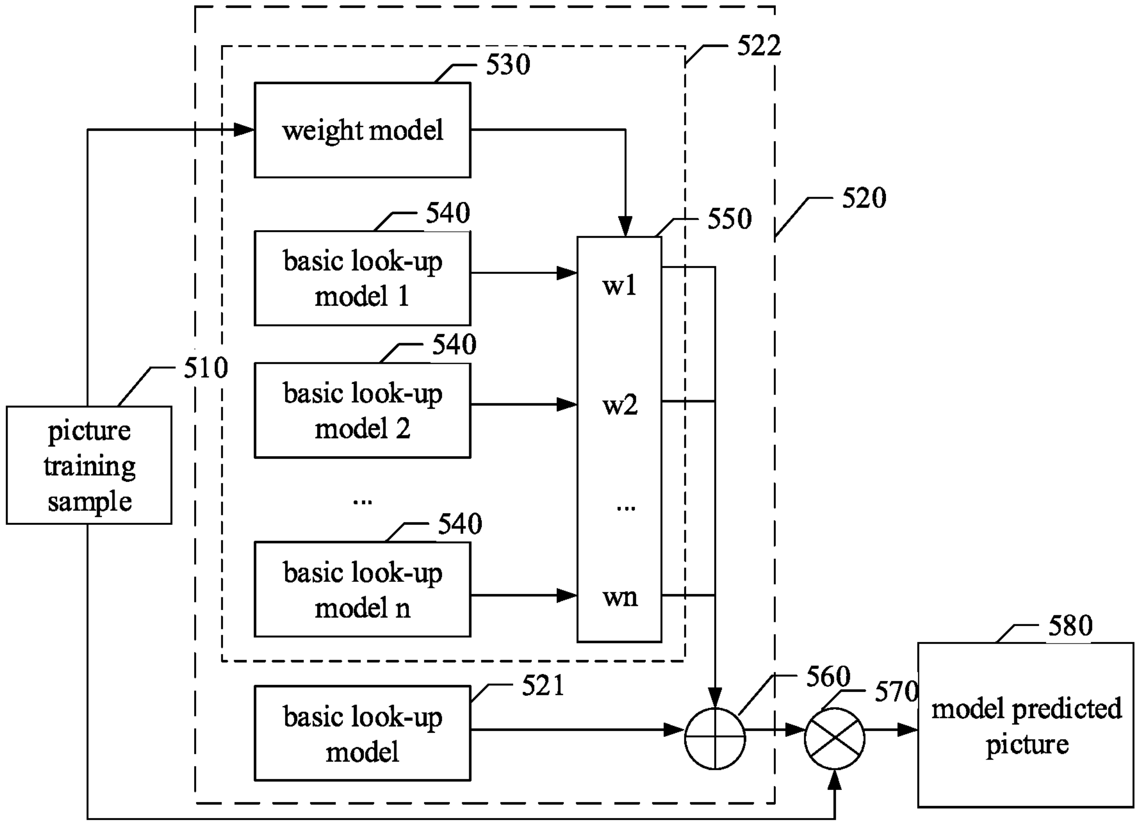
FIG. 5 schematically shows a structural diagram of a first optimization model in an embodiment of the present disclosure.

FIG. 5 schematically shows a structural diagram of a first optimization model. As shown in FIG. 5, a picture 510 is a picture training sample, a model 520 is a first optimization model, a model 521 is a basic look-up model, and a model 522 is a first derived model. In the first derived model 522, there are a weight model 530 and a plurality of basic look-up models 540. A value 550 is a weight value output by the weight model. A relationship 560 describes a linear combination relationship between the basic look-up model 521 and the first derived model 522. A relationship 570 describes that a model predicted picture 580 is obtained by inputting the picture training sample to the first optimization model.

Figure 6:
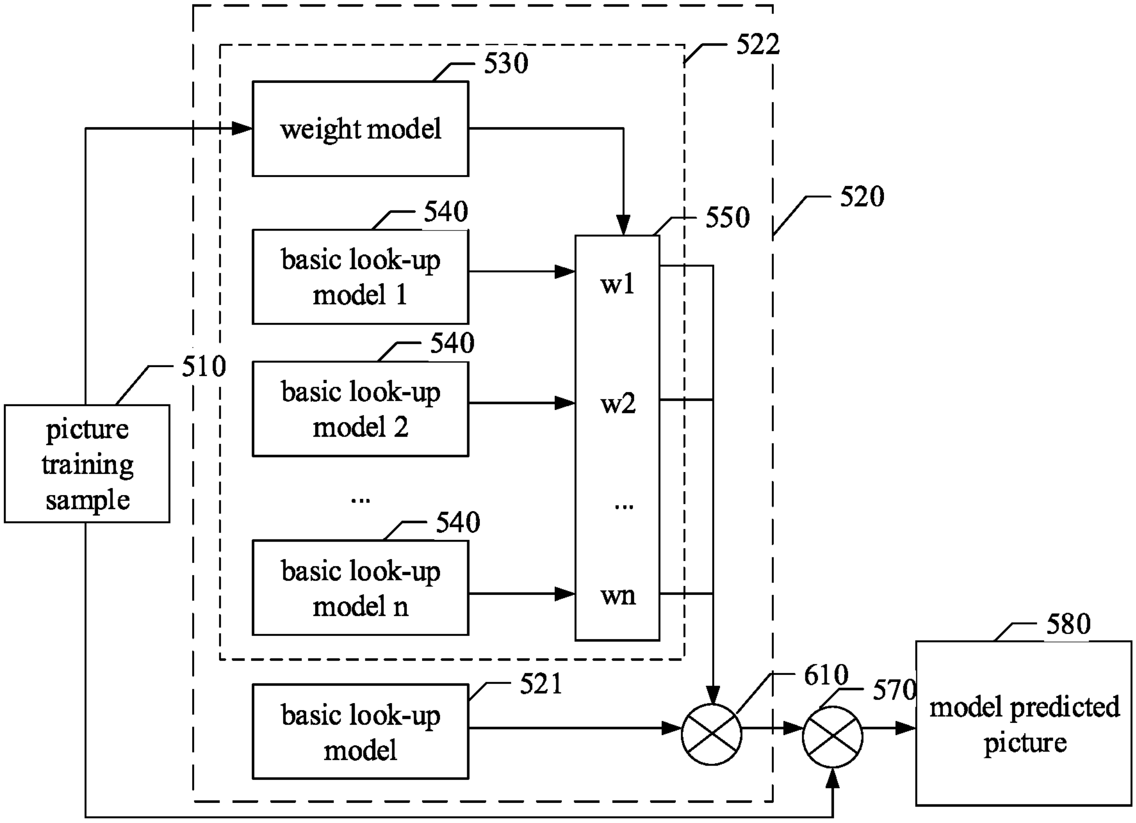
FIG. 6 schematically shows a structural diagram of another first optimization model in an embodiment of the present disclosure.

FIG. 6 schematically shows a structural diagram of another first optimization model. As shown in FIG. 6, it is noted that a relationship 610 describes that there is a product combination relationship between the basic look-up model 521 and the first derived model 522 at this time.

Based on FIG. 5 or FIG. 6, the picture training sample is input to the weight model in the first optimization model, and the weight model extracts a picture feature corresponding to the picture training sample.

For example, the picture training sample is input into the first optimization model as shown in FIG. 5, and the weight model in the first optimization model extracts a picture feature of the picture training sample.

In step S420, weight values corresponding to the plurality of basic look-up models in the first derived model are determined according to the picture feature.

After the weight model extracts the picture feature, the weight model generates weight values, the number of which is consistent with the number of basic look-up models in the first derived model, and these weight values are in a one-to-one correspondence with the plurality of basic look-up models in the first derived model.

For example, as shown in FIG. 5 or FIG. 6, after the picture training sample is input into the weight model 530, weight values 550 in a one-to-one correspondence with the basic look-up models 540 are obtained.

In step S430, according to the weight values which correspond to the plurality of basic look-up models in the first derived model, respectively, a plurality of basic color mapping relationships corresponding to the plurality of basic look-up models in the first derived model are updated, and a calculation is performed on an update result to obtain a first derived color mapping relationship corresponding to one first derived model.

There are a plurality of basic look-up models in the first derived model. Through the weight values which correspond to the plurality of basic look-up models, respectively, a plurality of basic color mapping relationships corresponding to the plurality of basic look-up models in the first derived model may be updated, to obtain a first derived color mapping relationship corresponding to the first derived model.

For example, as shown in FIG. 5, there is a first derived model in the first optimization model 520, and there are n basic look-up models in the first derived model. Based on this, there are n basic color mapping relationships. Specifically, the n basic color look-up models are RLUT1, RLUT2, . . . , RLUTn: RLUT 1 corresponds to a basic look-up model 1, RLUT 2 corresponds to a basic look-up model 2, and so on, and the last one (RLUTn) corresponds to a basic look-up model n.

In addition, there are n weight values. Specifically, the weight values include w1, w2, . . . , wn; the weight value w1 corresponds to the basic look-up model 1, the weight value w2 corresponds to the basic look-up model 2, and so on, and the last weight value wn corresponds to the basic look-up model n. Based on this, the first derived color mapping relationships are obtained as a product of w1 and RLUT1, a product of w2 and RLUT2, . . . , a product of wn and RLUT n. The process in FIG. 6 is similar to FIG. 5.

In step S440, based on a combination relationship corresponding to one basic look-up model and the first derived model of the first optimization model, the first derived color mapping relationship, and the basic color mapping relationship corresponding to one basic look-up model in the first optimization model, a first optimization color mapping relationship corresponding to the first optimization model is determined.

There is a combination relationship between one basic look-up model and the first derived model in the first optimization model. According to the combination relationship, the first derived color mapping relationship and the basis color mapping relationship corresponding to one basic look-up model in the first optimization model, the first optimization color mapping relationship corresponding to the first optimization model is determined.

For example, with respect to FIG. 5, the relationship 560 describes the linear combination relationship existing between one basic look-up model and the first derived model in the first optimization model. In addition, there are n basic color mapping relationships in the first derived model. Specifically, these n basic color look-up models are RLUT1, RLUT2, . . . , RLUTn; RLUT1 corresponds to the basic look-up model 1, RLUT2 corresponds to the basic look-up model 2, and so on, and the last one (RLUTn) corresponds to the basic look-up model n.

In addition, there are n weight values. Specifically, the weight values include w1, w2 . . . , wn; the weight value w1 corresponds to the basic look-up model 1, the weight value w2 corresponds to the basic look-up model 2, and so on, and the last weight value wn corresponds to the basic look-up model n.

Based on this, the determined first optimization color mapping relationship is:

$$BLUT + w1 \times BLUT1 + w2 \times BLUT2 + \ldots + wn \times BLUTn.$$

With respect to FIG. 6, the relationship 610 describes the product combination relationship between one basic look-up model and the first derived model in the first optimization model, and the first optimization color mapping relationship is: BLUT×w1×BLUT1×w2×BLUT2× . . . ×wn×BLUTn.

In step S450, the model predicted picture corresponding to the picture training sample is determined according to the first optimization color mapping relationship.

The first optimization color mapping relationship is a color mapping look-up relationship corresponding to the first optimization model. Based on this, the picture training sample is input into the first optimization model to obtain the model predicted picture.

In an example embodiment, the three-dimensional color look-up model may be the first optimization model, there is a weight model in the first optimization model, and the weight model can assign weights to the basic look-up models in the first derived model. In this way, it is possible to dynamically change the first optimization color mapping relationship corresponding to the first optimization model through the weights, which increases the flexibility of determining the first optimization model.

In an optional embodiment, the weight model includes one picture size fixing layer, a plurality of sampling layers and one output layer which are connected in sequence. The picture size fixing layer is used to fix the size of the picture training sample. The sampling layer is used to extract a picture feature corresponding to the picture training sample. The output layer is used to determine, according to the picture feature, weight values which correspond to the plurality of basic look-up models in the first derived model, respectively.

The picture size fixing layer refers to a layer structure that fixes the size of the picture training sample to a specific size. For example, the size of the picture training sample may be fixed to 256×256, or the size of the picture training sample may be fixed to 512×512, and the example embodiment does not impose special limitations on this. Specifically, the method of fixing the size of the picture training sample may be a nearest interpolation algorithm, or a bilinear interpolation algorithm, or a bicubic interpolation algorithm, or any other interpolation algorithm, and this example embodiment is not particularly limited.

The sampling layer(s) is(are) used to extract feature(s) of a picture training sample. Specifically, a sampling layer may include two convolutional layers, an activation function layer and a global normalization layer. The second convolutional layer may be replaced by the nearest interpolation algorithm, the bilinear interpolation algorithm, the bicubic interpolation algorithm or any one interpolation algorithm.

The output layer is used to output weight values corresponding one-to-one to the plurality of basic look-up models in the first derived model according to the picture feature(s).

Figure 7:
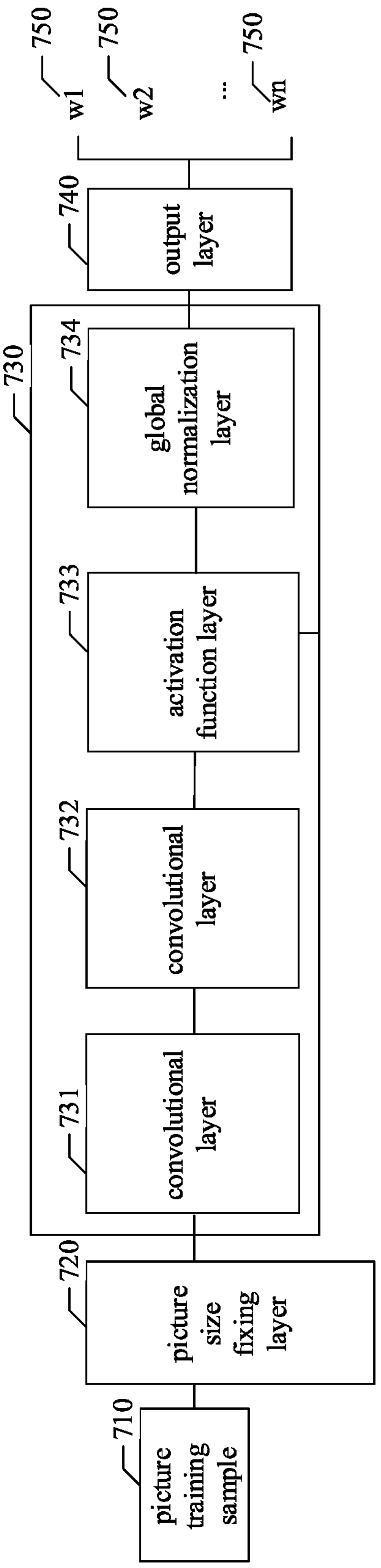
FIG. 7 schematically shows a structural diagram of a weight model in an embodiment of the present disclosure.

For example, FIG. 7 schematically shows a structural diagram of a weight model. As shown in FIG. 7, a picture 710 is a picture training sample, a layer 720 is a picture size fixing layer, a layer 730 is a sampling layer, a layer 740 is an output layer, and values 750 are weight values. The layer 730 may specifically include a layer 731 (a convolutional layer), a layer 732 (a convolutional layer), a layer 733 (an activation function layer) and a layer 734 (a global normalization layer). Furthermore, the convolution kernel of the layer 731 may be 3×3, and the stride of the layer 732 may be 1.

In the example embodiment, a weight model is provided to ensure that after inputting picture training sample into the weight model, weight values corresponding in one-to-one correspondence to the basic look-up models in the first derived model can be obtained.

Figure 8:
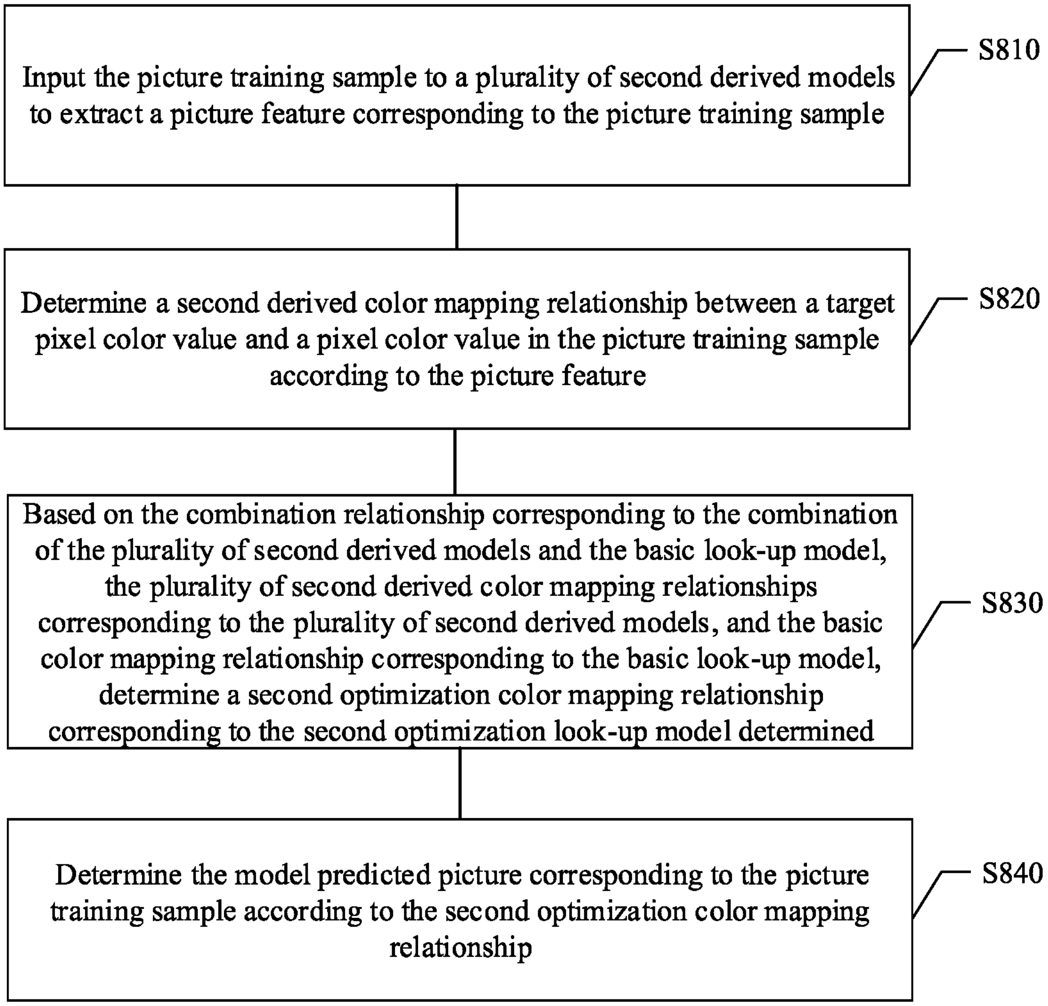
FIG. 8 schematically shows a flow chart for obtaining a model predicted picture in an embodiment of the present disclosure.

In an optional embodiment, FIG. 8 shows a schematic flow chart of obtaining a model predicted picture in a model training method for image processing. The three-dimensional color look-up model includes a second optimization model, and the second optimization model includes a combination of a plurality of second derived models and one basic look-up model. As shown in FIG. 8, the method at least includes the following steps. In step S810, the picture training sample is input to a plurality of second derived models to extract a picture feature corresponding to the picture training sample.

The three-dimensional look-up model may also be a second optimization model. Specifically, the difference between the second optimization model and the first optimization model is that: the second optimization model replaces the first derived model in the first optimization model with a plurality of second derived models. It should be noted that the second derived models do not include a weight model.

Based on this, the picture training sample is input into a plurality of second derived models to extract a picture feature of the picture training sample.

Figure 9:
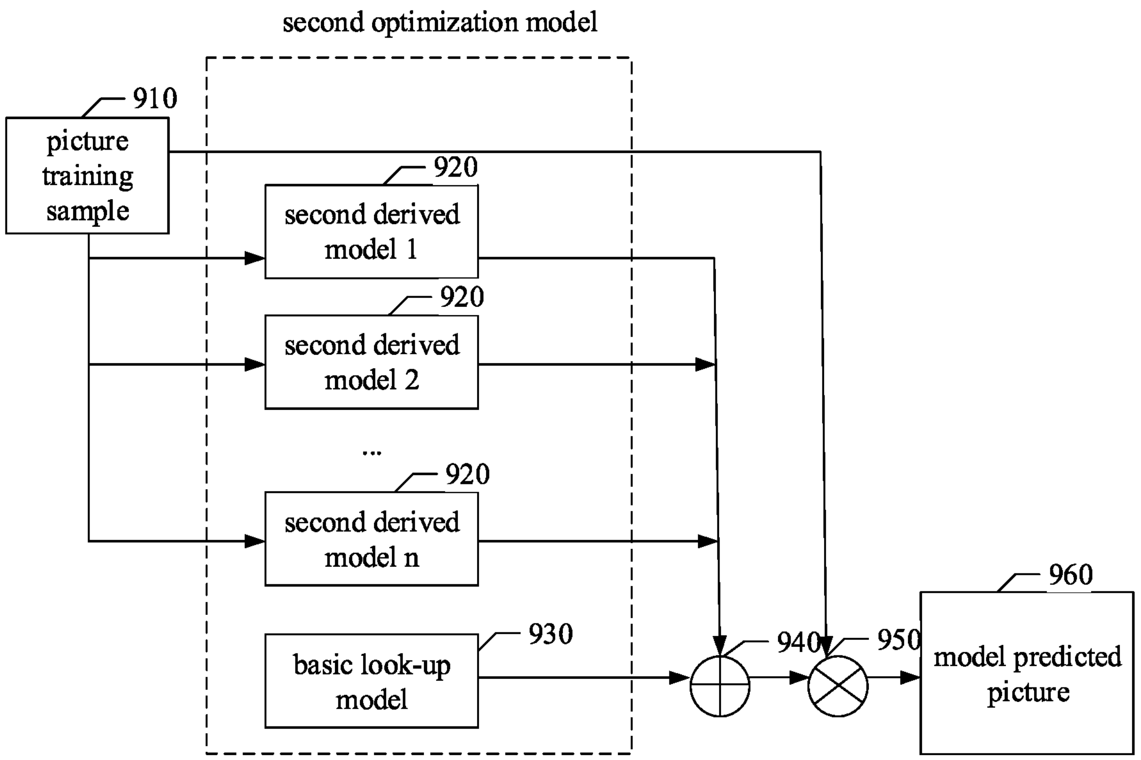
FIG. 9 schematically shows a structural diagram of a second optimization model in an embodiment of the present disclosure.

FIG. 9 schematically shows a structural diagram of a second optimization model. As shown in FIG. 9, a picture 910 is a picture training sample, models 920 are a plurality of second derived models, a model 930 is a basic look-up model, a relationship 940 describes a linear combination relationship between the plurality of second derived models and the basic look-up model, a relationship 950 is inputting the picture training sample into the second derived models, and a picture 960 is the model predicted result.

Figure 10:
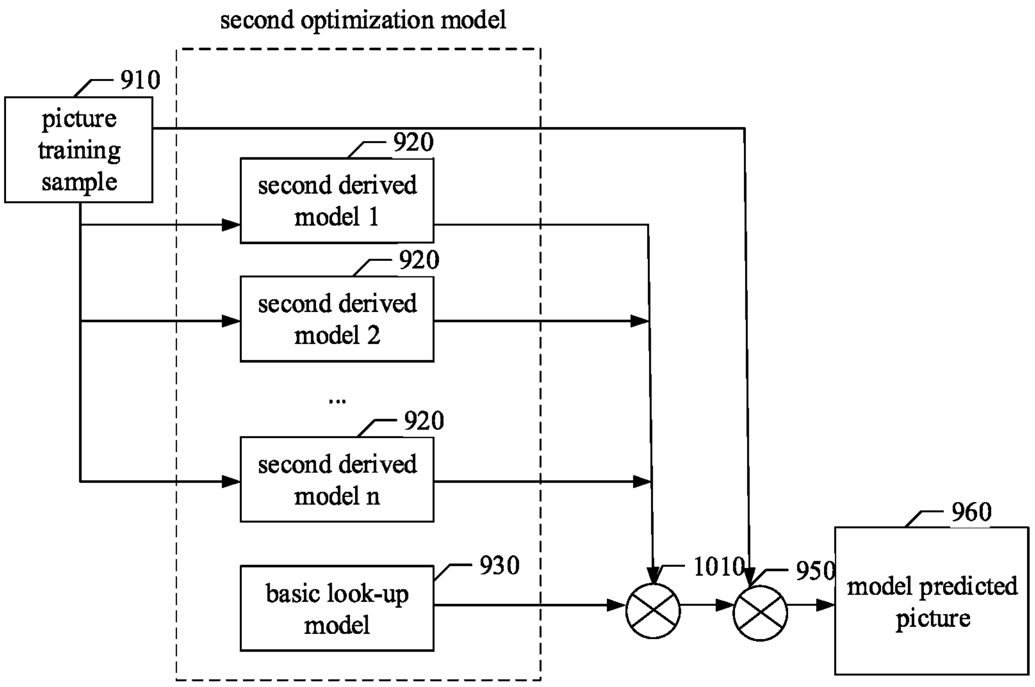
FIG. 10 schematically shows another structural diagram of a second optimization model in an embodiment of the present disclosure.

FIG. 10 schematically shows another structural diagram of a second optimization model. As shown in FIG. 10, a relationship 1010 describes a product combination relationship between the plurality of second derived models and the basic look-up model.

For example, based on FIG. 9 or FIG. 10, the picture training sample is input into a plurality of second derived models 920, to extract a picture feature of the picture training sample.

In step S820, a second derived color mapping relationship between a target pixel color value and a pixel color value in the picture training sample is determined according to the picture feature.

The second derived color mapping relationship is a color mapping relationship obtained based on a picture feature.

For example, in FIG. 9 or FIG. 10, RLutNet1 corresponding to the second derived model 1, RLutNet1 corresponding to the second derived model 2, . . . , and RLutNetn corresponding to the n-th derived model are the second derived color mapping relationships.

In step S830, based on the combination relationship corresponding to the combination of the plurality of second derived models and the basic look-up model, the plurality of second derived color mapping relationships corresponding to the plurality of second derived models, and the basic color mapping relationship corresponding to the basic look-up model, a second optimization color mapping relationship corresponding to the second optimization look-up model is determined.

According to the combination relationship corresponding to the combination of the plurality of second derived models and the basic look-up model, the plurality of second derived color mapping relationships corresponding to the plurality of second derived models, and the basic color mapping relationship corresponding to the basic look-up model, the second optimization color mapping relationship can be determined.

For example, with respect to FIG. 9, the second color mapping relationship is: BLUT2=BLUT+RLutNet1+RLutNet2+ . . . +RLutNetn, where BLUT2 is the second color mapping relationship.

with respect to FIG. 10, the second color mapping relationship is: BLUT2=BLUT×RLutNet1×RLutNet2× . . . ×RLutNetn, where BLUT2 is the second color mapping relationship.

In step S840, the model predicted picture corresponding to the picture training sample is determined according to the second optimization color mapping relationship.

The second optimization color mapping relationship refers to a color mapping relationship corresponding to the second optimization look-up model. By inputting the picture training sample to the second optimization model, the model predicted picture can be obtained based on the second optimization color mapping relationship.

For example, as shown in FIG. 9 or FIG. 10, the picture training sample 910 is input to the second optimization model to obtain the model predicted picture 960.

In the example embodiments, the second derived models improve the intelligence and flexibility of the model without relying on the weight model.

In an optional embodiment, a second derived model includes one picture size fixing layer, a matrix transformation layer, a plurality of sampling layers and one output layer which are connected in sequence. The picture size fixing layer is used to fix the size of the picture training sample. The matrix transformation layer is used to transform a matrix output by the picture size fixing layer. The sampling layers are used to extract a picture feature corresponding to the picture training sample. The output layer is used to output the second derived color mapping relationship corresponding to the picture feature.

The picture size fixing layer refers to a layer structure that fixes the size of the picture training sample to a specific size. For example, the size of the picture training sample may be fixed to 256×256, or the size of the picture training sample may be fixed to 512×512, and this example embodiment does not impose special limitations on this. Specifically, the method of fixing the size of the picture training sample may be a nearest interpolation algorithm, or a bilinear interpolation algorithm, or a bicubic interpolation algorithm, or any other interpolation algorithm, and this example embodiment is not particularly limited.

The matrix transformation layer is used to transform the matrix output by the picture size fixing layer. For example, the picture training sample is input into the picture size fixing layer to obtain a matrix [B, C, H, W], where C is the number of color channels, B is the batch size, H is the height of the picture training sample, and W is the width of the picture training sample. The matrix [B, C, H, W] is input to the matrix transformation layer to obtain [C, B, H, W].

The sampling layer(s) is(are) used to extract feature(s) of the picture training sample. Specifically, a sampling layer may include one convolutional layer, an activation function layer, a global normalization layer and a down-sampling layer. The convolution kernel of the convolutional layer may be 3×3. The down-sampling layer may be replaced by a convolutional layer, the nearest interpolation algorithm, the bilinear interpolation algorithm, the bicubic interpolation algorithm or any interpolation algorithm, and the number of down-sampling layer(s) is determined by the number of bits of the three-dimensional color look-up table corresponding to the basic look-up model and the specific size designed by the picture size fixing layer. For example, when the specific size designed by the picture size fixing layer is 256×256 and the number of bits of the three-dimensional color look-up table is 32 bits, three down-sampling layers can be set. When the specific size of the fixed picture size layer design is 512×512 and the number of bits of the three-dimensional color look-up table is 32 bits, four down-sampling layers can be set.

The output layer determines the number of bits of the second optimization model according to the feature information output by the sampling layer(s) to obtain the first derived color mapping relationship corresponding to the number of bits. Specifically, the output layer may include one convolutional layer, and when the number of bits of the second optimization model which needs to be obtained is 32 bits, a parameter of the convolutional layer is set to 3×3×32. When the number of bits of the second optimization model which needs to be obtained is 64 bits, a parameter of the convolutional layer is set to 3×3×64.

Figure 11:
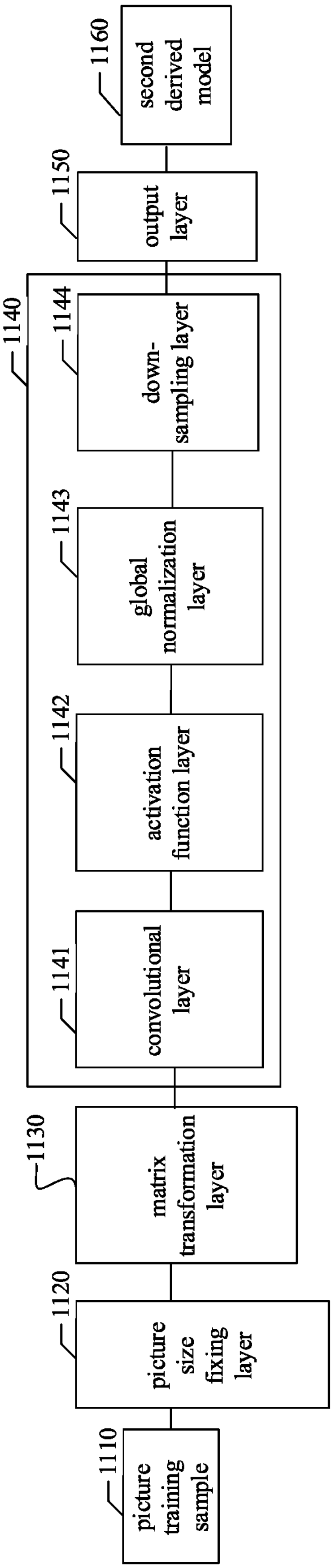
FIG. 11 schematically shows a structural diagram of a second derived model in an embodiment of the present disclosure.

For example, FIG. 11 schematically shows a structural diagram of a second derived model. As shown in FIG. 11, a picture 1110 is a picture training sample, a layer 1120 is a picture size fixing layer, a layer 1130 is a matrix transformation layer, a layer 1140 is a sampling layer, a layer 1150 is an output layer, and a model 1160 is the output second derived model, from which the second derived color mapping relationship may be obtained. The sampling layer 1140 includes a convolutional layer 1141, an activation function layer 1142, a global normalization layer 1143, and a down-sampling layer 1144.

In the example embodiment, a second derived look-up model is provided to ensure that after inputting the picture training sample to the second derived look-up model, a second derived color mapping model corresponding to the second derived look-up model can be obtained.

In an optional embodiment, the three-dimensional look-up model includes a combined model, and the combined model includes two first optimization models. A combination relationship of one of the optimization models in the combined model is a linear combination relationship, and a combination relationship of the other one of the first optimization models in the combined model is a product combination relationship.

A first optimization model includes one basic look-up model and a first derived model. First optimization models can be divided into two kinds of first optimization models depending on a combination relationship. One kind is a first optimization model A in which there is a linear combination relationship between one basic look-up model and a first derived model. The other kind is a first optimization model B in which there is a product combination relationship between one basic look-up model and a first derived model.

Based on this, the combined model may be two first optimization models with different combination relationships, that is, the combined model may be a combination of a first optimization model with a linear combination relationship and a first optimization model with a product combination relationship, and the sequence of the combination of the combined model is not limited.

Figure 12:
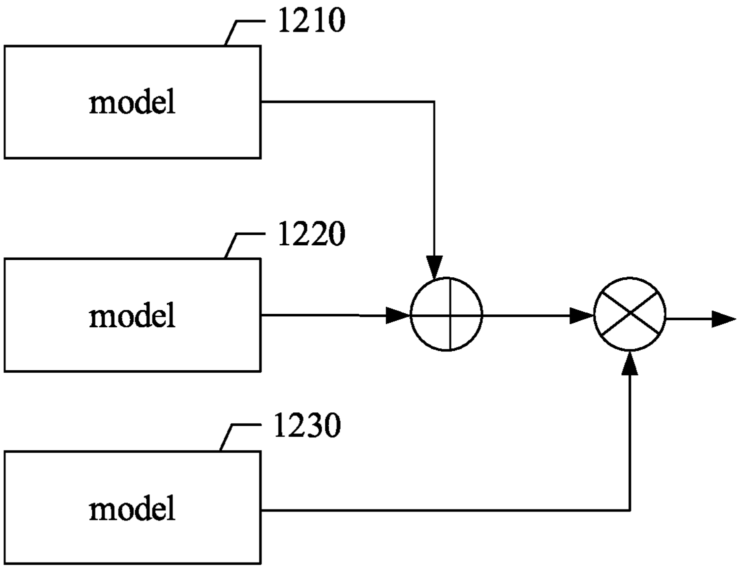
FIG. 12 schematically shows a structural diagram of a combined look-up model in an embodiment of the present disclosure.

For example, FIG. 12 schematically shows a structural diagram of a combined look-up model. As shown in FIG. 12, a model 1210 is a first derived model, and a model 1220 is a basic look-up model. There is a linear combination relationship between the model 1210 and the model 1220, and the model 1210 and the model 1220 constitute a first optimization model A with a linear combination relationship. A model 1230 may be a first optimization model B with a product combination relationship.

Figure 13:
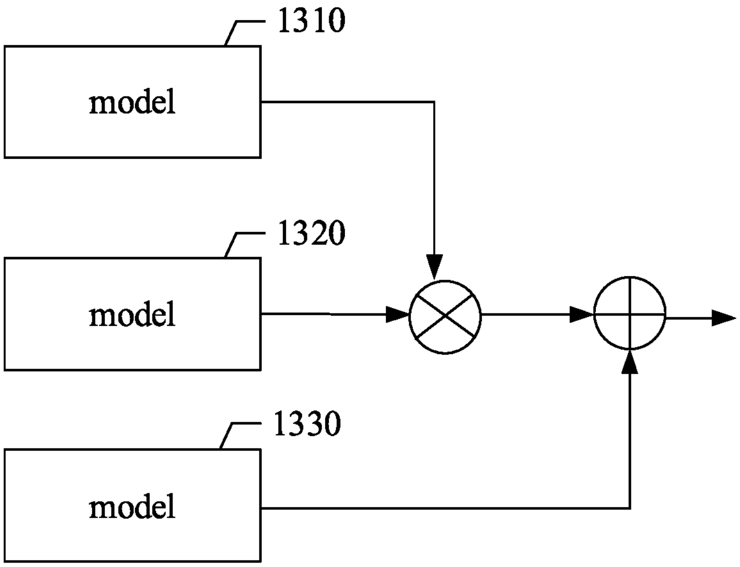
FIG. 13 schematically shows another structural diagram of a combined look-up model in an embodiment of the present disclosure.

FIG. 13 schematically shows another structural diagram of a combined model. As shown in FIG. 13, a model 1310 may be a first optimization model A with a linear combination relationship, a model 1320 is a basic look-up model, and a model 1330 is a first derived model. There is a product combination relationship between the first derived model and the model 1320, that is, the model 1320 and the model 1330 constitute a first optimization model B.

In addition, the combined model may also be second optimization models with different combination relationships. That is, the combined model may be a combination of a second optimization model with a linear combination relationship and a second optimization model with a product combination relationship, and the sequence of the combination of the combined model is not limited.

It should be noted that the subsequent training procedures for a model with a linear combination relationship (a first optimization model A and a second optimization model C) and a model with a product combination relationship (a first optimization model B and a second optimization model D) are different. It is precisely because of the difference in the subsequent training procedures, the model with the linear combination relationship is more inclined to extract a local feature of a picture training sample, while the model with the product combination relationship is more inclined to extract a global feature of the picture training sample. This leads to that a subsequently obtained model training result corresponding to the model with the linear combination relationship is more suitable for picture processing tasks such as processing details of a picture or super-resolution tasks, while a model training result corresponding to the model with the product combination relationship is more suitable for picture processing tasks such as processing picture exposure, picture defogging and picture color correction and so on.

In the example embodiment, the three-dimensional color look-up model includes a combined model. The combined model may be two first optimization models, and the combination relationships of the two first optimization models are different, which expands the picture task type to which the three-dimensional color look-up model is applicable, thereby expanding the application scenarios of the three-dimensional color look-up model.

In an optional embodiment, the three-dimensional color look-up model includes a combined model, and the combined model includes two second optimization models. One of the second optimization models in the combined model has a linear combination relationship, and the other one of the second optimization models in the combined model has a product combination relationship.

The combined model may also be second optimization models with different combination relationships. That is, the combined model may be a combination of a second optimization model with a linear combination relationship and a second optimization model with a product combination relationship, and the sequence of the combination of the combined model is not limited.

For example, as shown in FIG. 12, a model 1210 may also be a plurality of first derived models, a model 1220 is a basic look-up model, and there is a linear combination relationship between the model 1210 and the model 1220. Further, the model 1210 and the model 1220 form a second optimization model C with a linear combination relationship, and the model 1230 may be a second optimization model D with a product combination relationship.

In addition, as shown in FIG. 13, a model 1310 may be a second optimization model C' with a linear combination relationship, a model 1320 is a basic look-up model, and a model 1330 includes a plurality of second derived models, and there is a product combination relationship between the plurality of second derived models and the model 1320, that is, the model 1320 and the model 1330 constitute a second optimization model D.

In the example embodiment, the combined model includes second optimization models with different combination relationships, which expands the picture task type to which the three-dimensional color look-up model is applicable, thereby expanding the application scenarios of the three-dimensional color look-up model.

Figure 14:
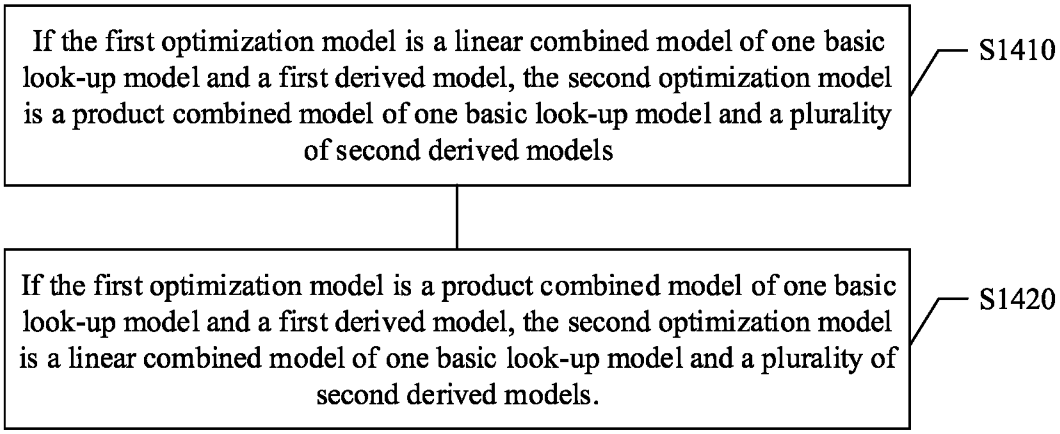
FIG. 14 schematically shows a flow chart for obtaining a combined model in an embodiment of the present disclosure.

In an optional embodiment. FIG. 14 shows a schematic flow chart of obtaining a combined model in a model training method for image processing. The combined model includes a combination of one first optimization model and one second optimization model; the first optimization model includes one basic look-up model and a first derived model. The first derived model includes a weight model and a plurality of basic look-up models. As shown in FIG. 14, the method at least includes the following steps. In step S1410, if the first optimization model is a linear combined model of one basic look-up model and a first derived model, the second optimization model is a product combined model of one basic look-up model and a plurality of second derived models.

The combined model may include one first optimization model and one second optimization model. When the first optimization model in the combined model is a linear combined model of one basic look-up model and a first derived model, the second optimization model is a product combined model of one basic model and a plurality of second derived models. The sequence of combination of the first optimization model and the second optimization model is not limited. The linear combined model refers to that there is a linear combination relationship between the one basic look-up model and the first derived model in the first optimization model. The product combined model refers to that there is a product combination relationship between the one basic look-up model and the plurality of second derived models in the second optimization model.

For example, as shown in FIG. 12, when the model 1210 is a first derived model, the first derived model 1210 and the basic look-up model 1220 form a first optimization model A with a linear combination relationship. At this time, the model 1230 is the second optimization model D, that is, in the second optimization model D, there is a product combination relationship between a basic look-up model and a plurality of second derived models.

For example, as shown in FIG. 13, when the model 1310 is a first optimization model A, that is, the model 1310 is a linear combined model of one basic look-up model and a first derived model, that is, there is a linear combination relationship between the one basic look-up model and the first derived model, the model 1330 includes a plurality of second derived models, and there is a product combination relationship between the model 1330 and the basic look-up model 1320, that is, the model 1320 and the model 1330 form a second optimization model D.

In step S1420, if the first optimization model is a product combined model of one basic look-up model and a first derived model, the second optimization model is a linear combined model of one basic look-up model and a plurality of second derived models.

The combined model may include one first optimization model and one second optimization model. When the first optimization model in the combined model is a product combined model of one basic model and a first derived model, the second optimization model is a linear combined model of one basic model and a plurality of second derived models.

For example, as shown in FIG. 12, when the model 1210 is a first derived model, and the first derived model 1210 and the basic look-up model 1220 form a first optimization model B with a product combination relationship, then the model 1230 is a second optimization model C, that is, in the second optimization model C, there is a linear combination relationship between the basic look-up model and the plurality of second derived models.

For example, as shown in FIG. 13, when the model 1310 is a first optimization model B, that is, the model 1310 is a product combined model of one basic look-up model and a first derived model, that is, there is a linear combination relationship between the one basic look-up model and the first derived model, the model 1330 includes a plurality of second derived models, and there is a linear combination relationship between the model 1330 and the basic look-up model 1320, that is, the model 1320 and the model 1330 form a second optimization model C.

In the example embodiment, the combined model is a model obtained by combining the first optimization model and the second optimization model. When the first optimization model is a linear combined model of one basic look-up model and a first derived model, the second optimization model is a product combined model of one basic look-up model and a plurality of second derived models. When the first optimization model is a product combined model of one basic look-up model and a first derived model, the second optimization model is a linear combined model of one basic look-up model and a plurality of second derived models. The example embodiment expands the type of picture task to which the three-dimensional color look-up model is applicable, thereby expanding the application scenarios of the three-dimensional color look-up model.

Figure 15:
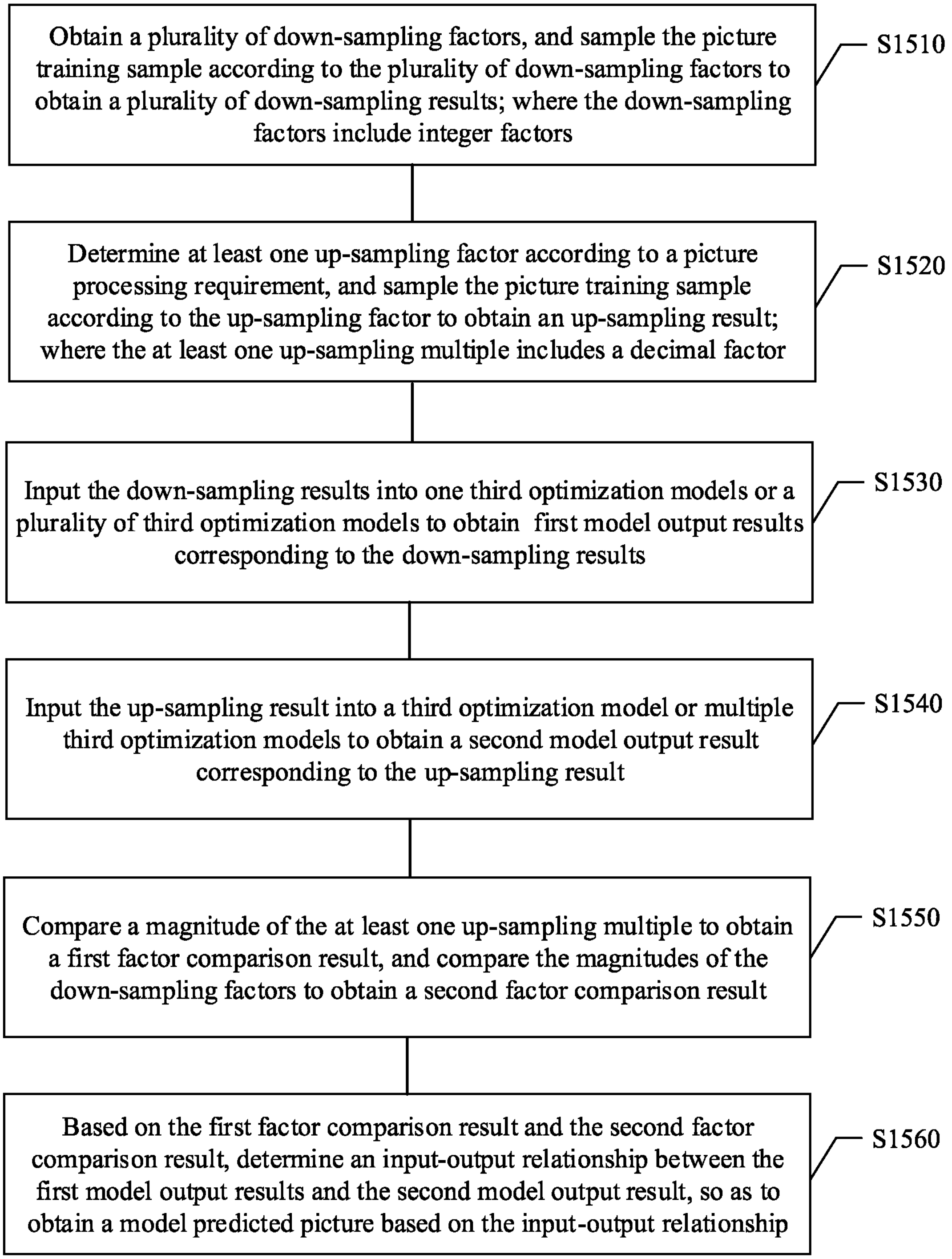
FIG. 15 schematically shows a flow chart for obtaining a model predicted picture in an embodiment of the present disclosure.

In an optional embodiment, FIG. 15 shows a schematic flow chart of obtaining a model predicted picture in a model training method for image processing. The three-dimensional color look-up model includes one or a plurality of third optimization models. The third optimization model is any one of: a basic look-up model, a first optimization model, a second optimization model and a combined look-up model. As shown in FIG. 15, the method at least includes the following steps. In step S1510, a plurality of down-sampling factors are obtained, and the picture training sample is sampled according to the plurality of down-sampling factors to obtain a plurality of down-sampling results; where the down-sampling factors include integer factors.

The three-dimensional look-up model may also be one or a plurality of third optimization models, and the third optimization model may be any one of: a basic look-up model, a first optimization model, a second optimization model and a combined look-up model.

The plurality of down-sampling factors refer to a plurality of integer sampling factors, which may be 2, 4, 8, 16; or may be 2, 4, 8, for example, and there is no special limitation on this in the example embodiment.

For example, the plurality of down-sampling factors are 2, 4, 8, 16, and a plurality of down-sampling results may be obtained by sampling the picture training sample according to the plurality of down-sampling factors. For example, the picture training sample is down-sampled according to the down-sampling factor 2 to obtain a down-sampling result 1. The picture training sample is down-sampled according to the down-sampling factor 4 to obtain a down-sampling result 2. The picture training sample is down-sampled according to the down-sampling factor 8 to obtain a down-sampling result 3. The picture training sample is down-sampled according to the down-sampling factor 16 to obtain a down-sampling result 4.

In step S1520, at least one up-sampling factor is determined according to a picture processing requirement, and the picture training sample is sampled according to the at least one up-sampling factor to obtain at least one up-sampling result; where the at least one up-sampling factor includes a decimal factor.

The picture processing requirement refers to a user's requirement for a picture processing result. For example, the picture processing requirement is to obtain a model predicted picture with the same size as the picture training sample, and at this time an up-sampling factor may not be needed. If the user requirement is to obtain a model predicted picture with a factor of 2.3 and the down-sampling factor is the power of 2, an up-sampling factor can be determined, and the up-sampling factor is 2.3. Two up-sampling factors may also be determined, which may be 2 and 1.15, respectively.

Based on this, the picture training sample is sampled according to the ap-sampling factor to obtain an up-sampling result.

For example, a user needs to obtain a model predicted picture with a factor of 2.3, and thus it can be determined that the number of the up-sampling factors is two, and the two up-sampling factors are 2 and 1.15 respectively. Based on this, the picture training sample is sampled according to the up-sampling factor of 2 obtain an up-sampling result 1, and the picture training sample is sampled according to the up-sampling factor of 1.15 to obtain an up-sampling result 2.

In step S1530, the down-sampling results are input into one third optimization models or a plurality of third optimization models to obtain first model output results corresponding to the down-sampling results.

The first model output result refers to a result obtained by inputting the down-sampling results into the third optimization model(s). Specifically, if there is only one third optimization model, each down-sampling result needs to be input into this third optimization model to obtain a corresponding first model output result. If there are a plurality of third optimization models, the number of the plurality of third optimization models is the same as the number of times of down-sampling, and the third optimization models are in one-to-one correspondence with the number of times of down-sampling. That is, a down-sampling result corresponding to a down-sampling factor A needs to be input into a third optimization model, and a down-sampling result corresponding to a down-sampling factor B needs to be input into another third optimization model, and so on, until all down-sampling results corresponding to all down-sampling factors are input into corresponding third optimization models.

For example, there are four down-sampling results, namely a down-sampling result A, a down-sampling result B, a down-sampling result C, and a down-sampling result D. If there is only one third optimization model, the down-sampling result A is input to the third optimization model to obtain a first model output result A1, the down-sampling result B is input to the third optimization model to obtain a first model output result B1, the down-sampling result C is input to the third optimization model to obtain a first model output result C1, and the down-sampling result D is input to the third optimization model to obtain a first model output result D1.

If there are four third optimization models, the down-sampling result A is input into the first one of the third optimization models to obtain a first model output result A1, the down-sampling result B is input into the second one of the third optimization models to obtain a first model output result B1, the down-sampling result C is input into the third one of the third optimization models to obtain a first model output result C1, and the down-sampling result D is input into the fourth one of the third optimization models to obtain a first model output result D1.

In step S1540, the at least one up-sampling result is input into one third optimization model or a plurality of third optimization models to obtain a second model output result corresponding to the at least one up-sampling result.

The second model output result refers to a result obtained by inputting the up-sampling result into the third optimization model(s). Specifically, if there is only one third optimization model, each up-sampling result needs to be input into this third optimization model to obtain a corresponding second model output result. If there are a plurality of third optimization models, the number of the plurality of third optimization models is the same as the number of times of up-sampling, and the third optimization models are in a one-to-one correspondence with the number of times of up-sampling. That is, an up-sampling result corresponding to an up-sampling factor E needs to be input to one third optimization model, and an up-sampling result corresponding to an up-sampling factor F needs to be input to another third optimization model, and so on, until up-sampling results corresponding to all up-sampling factors are input to corresponding third optimization models.

For example, there are two up-sampling results, namely an up-sampling result E and an up-sampling result F. If there is only one third optimization model, the up-sampling result E is input to the third optimization model to obtain a second model output result E1, and the up-sampling result F is input into the third optimization model to obtain a second model output result F1.

If there are two third optimization models, the up-sampling result A is input into the first one of the third optimization models to obtain a second model output result e1, and the down-sampling result F is input into the second one of the third optimization models to obtain a second model output result f1.

In step S1550, the magnitude of the at least one up-sampling factor is compared to obtain a first factor comparison result, and the magnitudes of the down-sampling factors are compared to obtain ta second factor comparison result.

The first factor comparison result is a comparison result of the magnitude of the at least one up-sampling factor, and the second factor comparison result is a comparison result of the magnitudes of the down-sampling factors.

For example, if the down-sampling factors are 2, 4, 8, 16, and the up-sampling factors are 2, 1.15, then the first factor comparison result is that: 16 is greater than 8, 8 is greater than 4, and 4 is greater than 2; and the second factor comparison result is that: 2 is greater than 1.15.

In step S1560, based on the first factor comparison result and the second factor comparison result, an input-output relationship between the first model output results and the second model output result is determined, so as to obtain a model predicted picture based on the input-output relationship.

According to the first factor comparison result and the second factor comparison result, the input-output relationship between the first model output result and the second model output result can be determined. Specifically, the down-sampling result with the highest factor is input to a third optimization model to obtain a first model output result. At this time, the first model output result and a first model output result corresponding to a down-sampling result corresponding to an adjacent factor can be used together as the next input of the third optimization model, and so on, until all down-sampling results are input to the third optimization model.

Based on this, a first model output result obtained by inputting the last down-sampling result to the third optimization model and the first up-sampling result are used as a new third optimization model input to obtain a second model output result, and the second model output result and the next up-sampling result are input into the third optimization model again, and so on, until all up-sampling results are input into the third optimization model.

Figure 16:
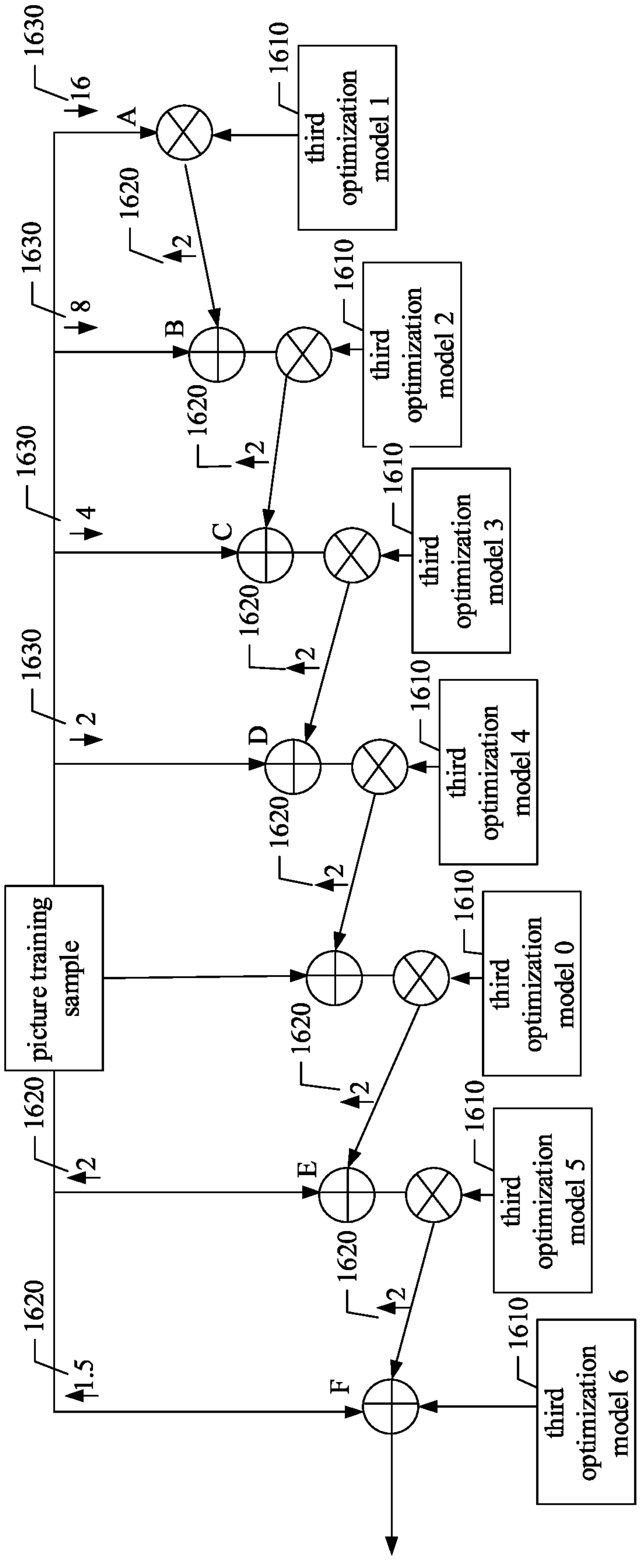
FIG. 16 schematically shows a model structural diagram when a three-dimensional color look-up model is a third optimization model in an embodiment of the present disclosure.

FIG. 16 schematically shows a schematic diagram of a model structure when the three-dimensional color look-up model is a third optimization model. As shown in FIG. 16, models 1610 are a plurality of third optimization models, values 1620 are up-sampling factors, and values 1630 are down-sampling factors. Specifically, the down-sampling factors are 2, 4, 8, 16, respectively. Based on this, a down-sampling result A corresponding to the down-sampling factor 16 needs to be input into a third optimization model 1, a down-sampling result B corresponding to the down-sampling factor 8 needs to be input into a third optimization model 2, a down-sampling result C corresponding to the down-sampling factor 4 needs to be input into a third optimization model 3, a down-sampling result D corresponding to the down-sampling factor 2 needs to be input into a third optimization model 4, an up-sampling result E corresponding to the up-sampling factor 2 needs to be input to a third optimization model 5, and an up-sampling result F corresponding to the up-sampling 4 needs to be input to a third optimization in model 6.

The first factor comparison result is obtained by comparing the magnitudes of the up-sampling factors, and the second factor comparison result is obtained by comparing the magnitudes of the down-sampling factors, in which 16 is greater than 8, 8 is greater than 4, 4 is greater than 2, and 2 is greater than 1.5. Therefore, the first output result of the third optimization model 1 and the down-sampling result B are used as the input of the third optimization model 2, the first output result of the third optimization model 2 and the down-sampling result C are used as the input of the third optimization model 3, and so on, until the first output result of the third optimization model 5 and the up-sampling result F corresponding to the up-sampling factor 1.5 are input into the third optimization model 6, and at this time, the output of the third optimization model 6 is the target predicted picture.

Figure 17:
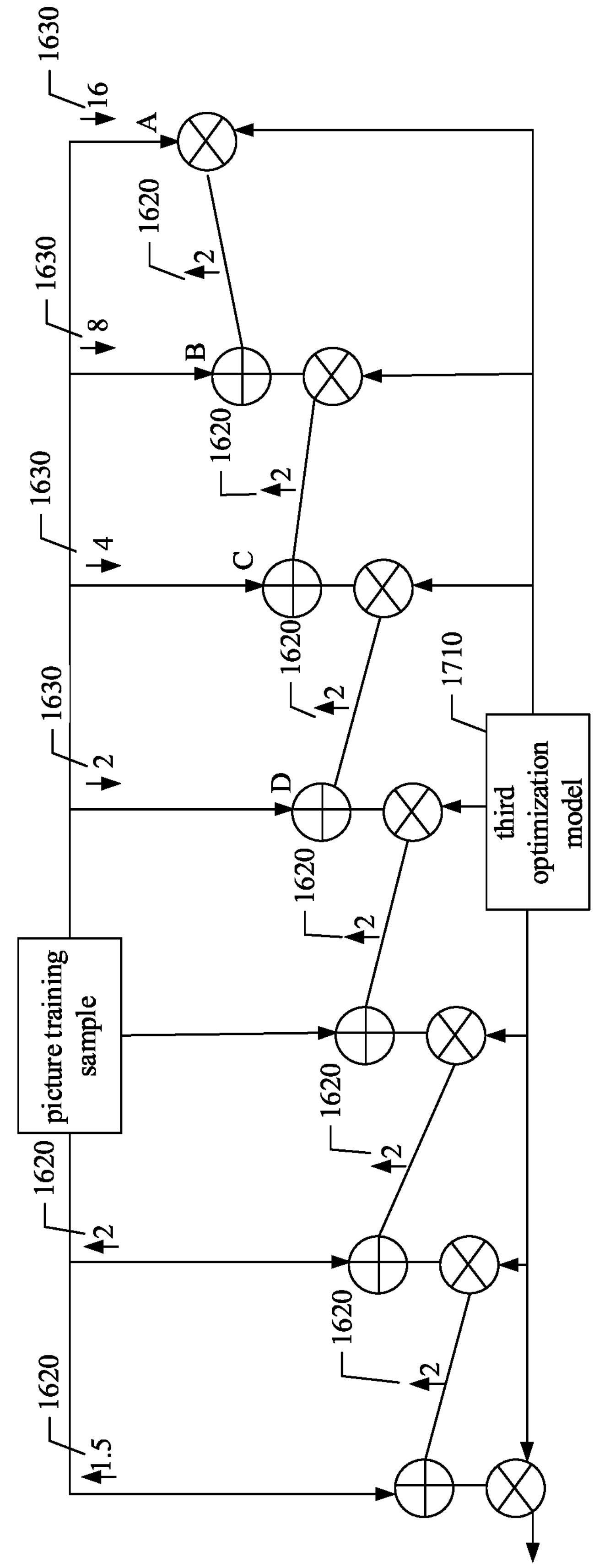
FIG. 17 schematically shows a model structural diagram when a three-dimensional color look-up model is a third optimization model in an embodiment of the present disclosure.

FIG. 17 schematically shows a schematic diagram of a model structure when the three-dimensional color look-up model is a third optimization model. As shown in FIG. 17, there is only one first optimization model 1710, and the remaining input and output relationships are the same as that shown in FIG. 16.

It should be noted that with respect to FIG. 16, it is still needed to first obtain the ground truth picture Z corresponding to the picture training sample, and then after inputting the down-sampling result corresponding to the down-sampling factor 16 into the third optimization model 1, a first model output result A1 is obtained. At this time, the loss calculation needs to be performed on the first model output result A1 and the ground truth picture Z to obtain loss1. Similarly, after obtaining a first model output result B1 corresponding to the second optimization model 2, it is still needed to perform loss calculation on the first model output result B1 and the ground truth picture Z to obtain loss2, and so on, until loss5 corresponding to the third optimization model 5 is calculated.

Based on this, loss1, loss2, loss3, loss4, loss0 and loss5 are obtained at this time. By adding loss1, loss2, loss3, loss4, loss0 and loss5, the calculation result after performing loss calculation on the model shown in FIG. 15 can be obtained.

Similarly, with respect to the model shown in FIG. 17, the difference from FIG. 16 is that there is only one third optimization model.

For example, by inputting picture training sample into the model structure shown in FIG. 16, an image processing result at corresponding factors can be obtained.

In the example embodiments, on the one hand, the up-sampling factor(s) is(are) determined according to an image processing requirement, and the up-sampling factor(s) includes (include) a decimal factor. Thus, a model predicted picture of any resolution can be flexibly obtained. On the other hand, the third optimization model can be any one of the basic look-up model, the first optimization model, the second optimization model and the combined model. Therefore, different third optimization models can be set according to the image processing requirements to meet different image processing requirements, thereby expanding scope of application of the three-dimensional color look-up model.

In step S130, the three-dimensional color look-up model is adjusted according to the loss calculation result to obtain a target image processing model, where the target image processing model is used to perform image processing on an image to be processed to obtain an image processing result corresponding to the image to be processed.

In this example embodiment, the three-dimensional look-up model can be adjusted according to the loss calculation result to obtain the target image processing model, and the image to be processed is input into the target image processing model to obtain the image processing result corresponding to the image to be processed.

For example, the loss calculation result may be a result obtained using a color loss function to perform calculation on the picture training sample and the ground truth picture. The three-dimensional color look-up model is adjusted using the loss calculation result and the target image processing model A can be obtained. By inputting a picture with insufficient colors into the target image processing model A, a picture processing result can be obtained, that is, a picture with restored colors.

In an optional embodiment, there is a linear combination relationship between one basic look-up model and one derived model in a first optimization model. Adjusting the three-dimensional color look-up model according to the loss calculation result to obtain the target image processing model, includes: if there is a linear combination relationship between one basic look-up model and a first derived model in a first optimization model, adjusting the weight values corresponding to the plurality of basic look-up models in the first derived model and the basic color mapping relationships corresponding to the basic look-up models in the first derived model according to the loss calculation result, to obtain the target image processing model.

In the first optimization model, there are two combination relationships between the basic look-up model and the first derived model, which are a linear combination relationship and a product combination relationship.

For the first optimization model of the linear combination relationship, usually, the parameters of the basic look-up models in the first derived model are fixed, that is, the basic color mapping relationships corresponding to the basic look-up models in the first derived model are fixed. The target image processing model can be obtained by adjusting the weight values corresponding to the plurality of basic look-up models in the first derived model and the basic look-up model that has a linear combination relationship with the first derived model according to the loss calculation result.

For example, as shown in FIG. 5, the weight values 550 and the basic color mapping relationships corresponding to the basic look-up models 540 in the first derived model 522 need to be adjusted according to the loss calculation result.

In this example embodiment, when the basic look-up model and the first derived model are in a linear combination relationship, only the weight values and the basic color mapping relationships corresponding to the basic look-up models in the first derived model can be adjusted. Based on this, according to different training procedures, a target image processing model that is more suitable for local features of a picture is obtained.

Figure 18:
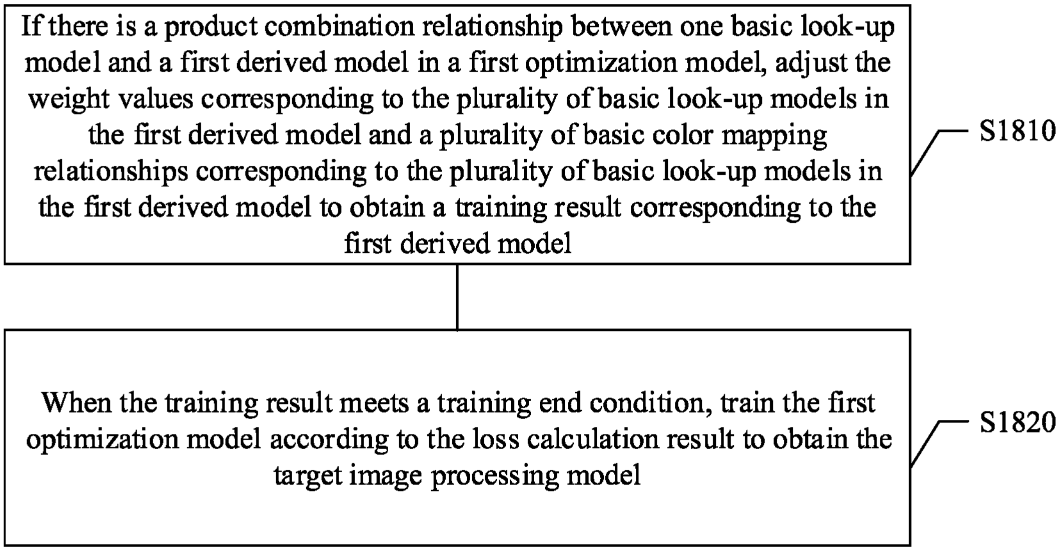
FIG. 18 schematically shows a flow chart of adjusting a three-dimensional color look-up model to obtain a target image processing model in an embodiment of the present disclosure.

In an optional embodiment, there is a product combination relationship between one basic look-up model and a first derived model in a first optimization model. FIG. 18 shows a schematic flow chart of adjusting a three-dimensional color look-up model to obtain a target image processing model in a model training method for image processing. As shown in FIG. 18, the method at least includes the following steps. In step S1810, if there is a product combination relationship between one basic look-up model and a first derived model in a first optimization model, the weight values corresponding to the plurality of basic look-up models in the first derived model and a plurality of basic color mapping relationships corresponding to the plurality of basic look-up models in the first derived model are adjusted to obtain a training result corresponding to the first derived model.

For the product combination relationship, the training procedure can be divided into two stages. In the first stage, only the first derived model in the first optimization model is trained to obtain a training result corresponding to the first derived model. In the second stage, the first derived model and the one basic look-up model in the first optimization model are regarded as a whole and trained to obtain the final target image processing model.

Specifically, in the first stage, the parameter of the basic look-up model in the first optimization model is first kept unchanged, and the weight values of the weight model in the first derived model and the basic color mapping relationships corresponding to the basic look-up models in the first derived model are adjusted to obtain the training result corresponding to the first derived model.

For example, as shown in FIG. 6, the weight values in the weight model 530 are adjusted according to the loss calculation result, and the basic color mapping relationships corresponding to the basic look-up models in the first derived model 522 are adjusted to obtain a training result corresponding to the first derived model 522.

In step S1820, when the training result meets a training end condition, the first optimization model is trained according to the loss calculation result to obtain the target image processing model.

The training end condition may be a condition of convergence. Specifically, it may be a training end condition corresponding to the first derived model. When the training result meets the training end condition, it is indicated that the first stage of the training has ended at this time, and the second stage of the training needs to be started.

Specifically, in the second stage of the training, the first optimization model needs to be trained according to the loss calculation result, that is, the first derived model and the basic look-up model in the first optimization model need to be trained to make the model training result more suitable for processing global features of a picture.

For example, as shown in FIG. 6, the weight values in the weight model 530 are adjusted according to the loss calculation result, and the basic color mapping relationships corresponding to the basic look-up models in the first derived model 522 are adjusted to obtain a training result corresponding to the first derived model 522.

When the training result meets a training end condition, the whole of the first optimization model 520 is trained according to the loss calculation result. At this time, the basic look-up model 521 also needs to be adjusted until the target image processing model is obtained.

In the example embodiment, when the combination of the basic look-up model and the first derived model is a product combination, it is needed to first adjust the weight values and the basic color mapping relationships corresponding to the basic look-up models in the first derived model, and then the first optimization model is adjusted as a whole. Based on this, according to different training procedures, a target image processing model that is more suitable for global features of a picture is obtained.

In an optional embodiment, there is a linear combination relationship between one basic look-up model and a plurality of second derived models in a second optimization model. Adjusting the three-dimensional color look-up model according to the loss calculation result to obtain the target image processing model, includes: if there is a linear combination relationship between one basic look-up model and a plurality of second derived models in the second optimization model, adjusting the second derived color mapping relationships according to the loss calculation result to obtain the target image processing model.

In the second optimization model, there are two combination relationships between the basic look-up model and the second derived models, which are a linear combination relationship and a product combination relationship. For the linear combination relationship, usually, a parameter of the basic look-up model in the second optimization model is fixed, and it is only needed to adjust the second derived color mapping relationships corresponding to plurality of second derived models in the second optimization model according to the loss calculation result.

For example, as shown in FIG. 9, a plurality of second derived color mapping relationships corresponding to the plurality of second derived models 920 need to be adjusted according to the loss calculation result.

In an optional embodiment, when the combination of the basic look-up model and the second derived models is a linear combination, it is possible to only adjust the second derived color mapping relationships. Based on this, according to different training procedures, a target image processing model more suitable for local features of a picture can be obtained.

Figure 19:
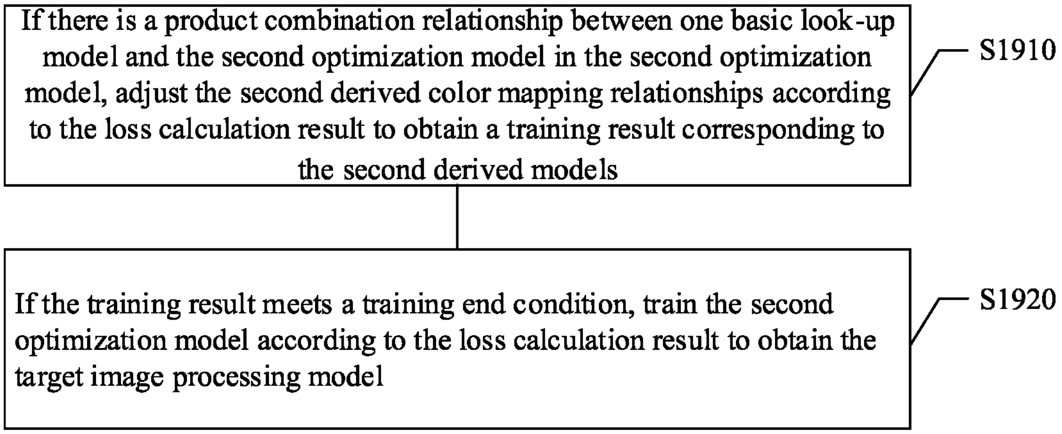
FIG. 19 schematically shows a flow chart of adjusting a parameter in a three-dimensional color look-up model to obtain a target image processing model in an embodiment of the present disclosure.

In an optional embodiment, FIG. 19 shows a schematic flow chart of adjusting a parameter in a three-dimensional color look-up model to obtain a target image processing model in a model training model for image processing. There is a product combination relationship between one basic look-up model and second derived models in a second optimization model. As shown in FIG. 19, the method at least includes the following steps. In step S1910, if there is a product combination relationship between one basic look-up model and the second derived model in the second optimization model, the second derived color mapping relationships are adjusted according to the loss calculation result to obtain a training result corresponding to the second derived models.

In the second optimization model, there are two combination relationships between the basic look-up model and the second derived models, which are a linear combination relationship and a product combination relationship. For the product combination relationship, the training procedure is divided into two stages. In the first training stage, a parameter of the basic look-up model in the second optimization model is first kept unchanged, and then according to the loss calculation result, only the second derived color mapping relationships corresponding to the second derived models are adjusted, to obtain training results corresponding to the second derived models.

For example, as shown in FIG. 9, the second derived color mapping relationships corresponding to the second derived models 920 are adjusted according to the loss calculation result.

In step S1920, if the training result meets a training end condition, the second optimization model is trained according to the loss calculation result to obtain the target image processing model.

The training end condition may be a condition of convergence. Specifically, it may be a condition of convergence for a second derived color mapping relationship in the first stage of training. When the training result meets the training end condition, the second stage of training needs to be started. That is, according to the loss calculation result, the second optimization model is adjusted as a whole, so that the obtained target image processing model is more suitable for processing global features of a picture.

For example, as shown in FIG. 9, according to the loss calculation result, the second derivative color mapping relationships corresponding to the second derived models 920 are adjusted to obtain the training results.

When the training result meets the training end condition, the whole of the second optimization model is trained according to the loss calculation result. At this time, a parameter in the basic look-up model 930 also needs to be adjusted until the model training result is obtained, that is, the target image processing model is obtained.

In the example embodiments, when the combination of the basic look-up model and the second derived models is a product combination, the second derived color mapping relationships need to be adjusted first, and then the second optimization model as a whole is adjusted. Based on this, according to different training procedures, a target image processing model more suitable for global features of a picture can be obtained.

Figure 20:
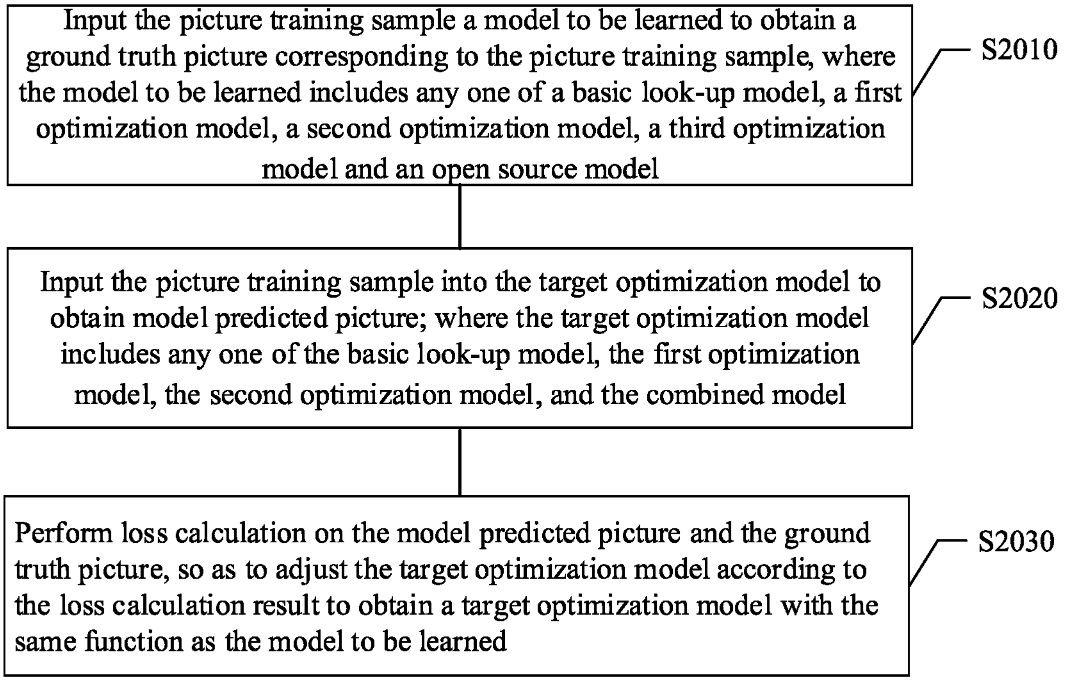
FIG. 20 schematically shows a flow chart for obtaining a target optimization model with the same function as a model to be learned in an embodiment of the present disclosure.

In an optional embodiment, FIG. 20 shows a schematic flow chart of obtaining a target optimization model with the same function as a model to be learned in a model training method for image processing. As shown in FIG. 20, the method at least includes the following steps. In step S2010, the picture training sample is input into a model to be learned to obtain a ground truth picture corresponding to the picture training sample. The model to be learned includes any one of a basic look-up model, a first optimization model, a second optimization model, a third optimization model and an open source model.

The picture training sample is input to the model to be learned to obtain the ground truth picture. It should be noted that the model to be learned may be any one of the basic look-up model, the first optimization model, the second optimization model, the third optimization model and the open source model. The open source model refer to a model that has been made public and can be used directly.

For example, by inputting the picture training sample into the third optimization model as shown in FIG. 15, the corresponding ground truth picture can be obtained.

In step S2020, the picture training sample is input into the target optimization model to obtain model predicted picture; where the target optimization model includes any one of the basic look-up model, the first optimization model, the second optimization model, and the combined model.

The target optimization model refers to any one of the basic look-up model, the first optimization model, the second optimization model and the combined model.

By inputting a picture into the target optimization model, a model predicted picture can be obtained.

For example, by inputting a picture training sample into the combined model as shown in FIG. 12, a corresponding output result can be obtained, that is, the model predicted picture.

In step S2030, loss calculation is performed on the model predicted picture and the ground truth picture, so as to adjust the target optimization model according to the loss calculation result to obtain a target optimization model with the same function as the model to be learned.

Figure 21:
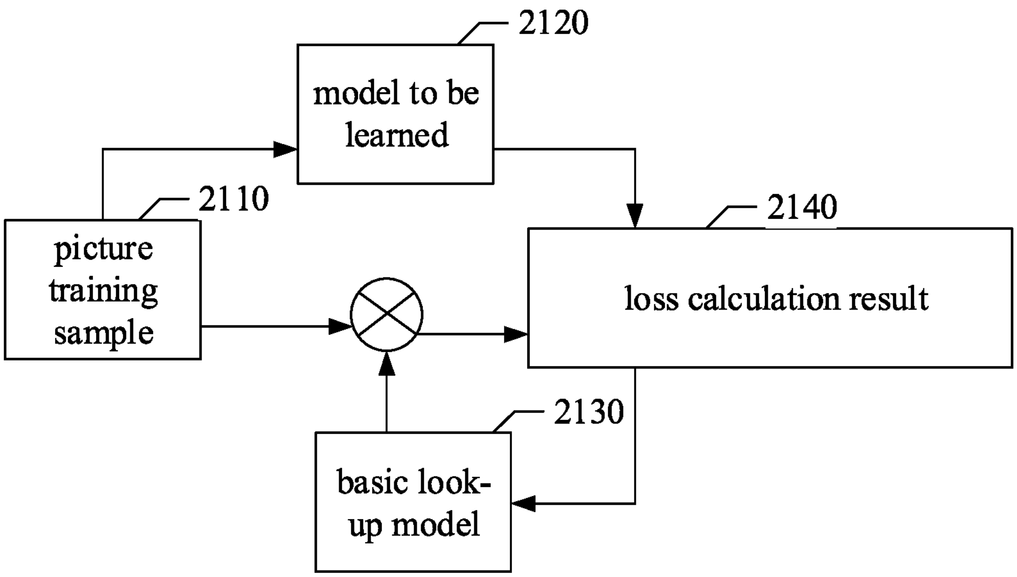
FIG. 21 schematically shows a model structure diagram of a model training method for image processing in an embodiment of the present disclosure.

FIG. 21 shows a schematic diagram of a model structure of a model training method for image processing. As shown in FIG. 21, a picture 2110 is a picture training sample, a model 2120 is a model to be learned, a model 2130 is a basic look-up model, that is, a target optimization model, and a result 2140 is a loss calculation result. Specifically, the loss calculation result 2140 is obtained by performing a loss calculation on the model predicted picture and the ground truth picture. After the loss calculation result is obtained, the model mapping relationship in the basic look-up model is adjusted. For the basic look-up model, the model color mapping relationship is a basic color mapping relationship. Through the training in the above procedure, a target optimization model with the same function as the model 2120 to be learned can finally be obtained.

Figure 22:
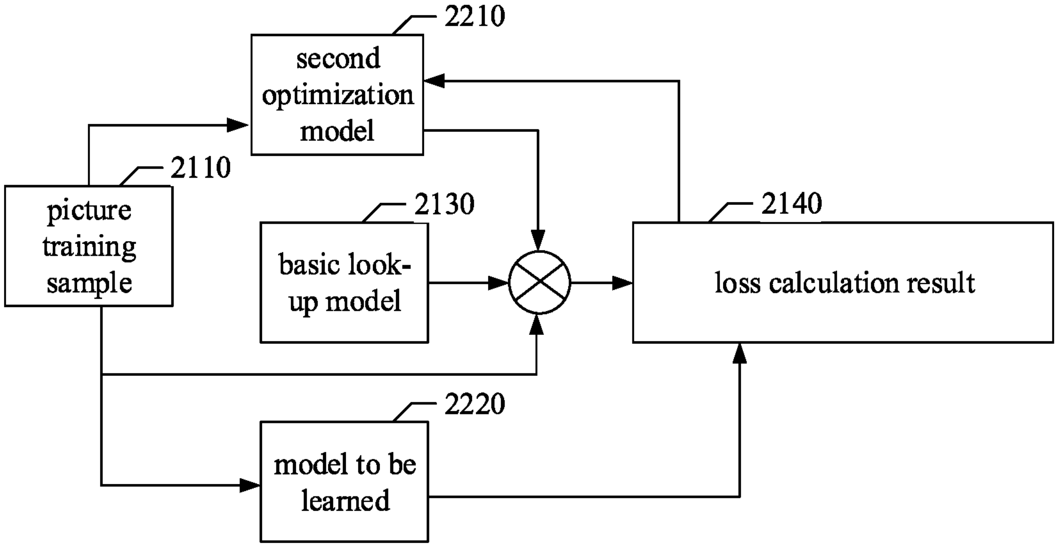
FIG. 22 schematically shows a model structure diagram of another model training method for image processing in an embodiment of the present disclosure.

For example, FIG. 22 shows a schematic diagram of a model structure of another model training method for image processing. As shown in FIG. 22, a model 2210 is a second optimization model, and a model mapping relationship of the second optimization model is adjusted according to a loss calculation result. For the second optimization model, its model mapping relationship are second derived color mapping relationships and a basic color mapping relationship. Through the training in the above procedure, a second optimization model with the same function as the model 2220 to be learned can finally be obtained.

In this example embodiment, a target optimization model with the same function as the model to be learned is obtained. When the model to be learned is a complex model, a target optimization model with a simple model structure can be obtained through the above procedure, and the target optimization model has the same functionality as the model to be learned.

In the methods and apparatuses provided by example embodiments of the present disclosure, on the one hand, the target image processing model is a result obtained by training a three-dimensional color look-up model. This can avoid a situation in related art in which the image processing result is obtained based on a one-dimensional color look-up table. Thus, the accuracy of the image processing result in the present disclosure can be ensured. On the other hand, since the three-dimensional color look-up model is three-dimensional, the three-dimensional color look-up model has a larger data capacity than the one-dimensional color look-up table in the prior art, and thus the present disclosure can meet different image processing requirements and expand the application scenarios of image processing.

Figure 23:
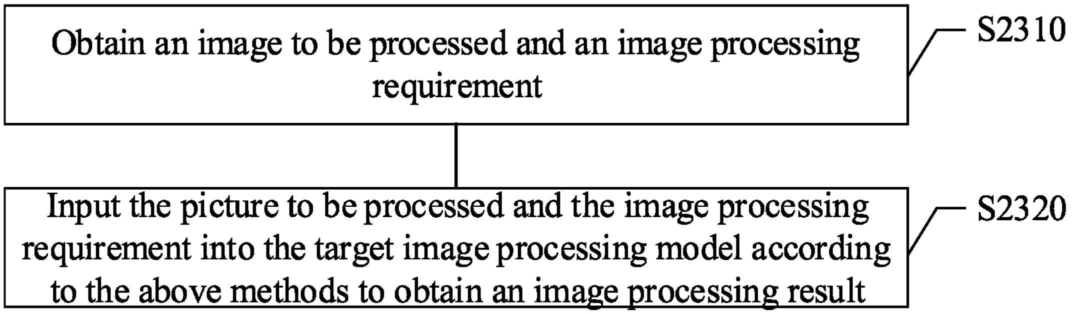
FIG. 23 schematically shows a flow chart of an image processing method in an embodiment of the present disclosure.

In addition, in an example embodiment of the present disclosure, an image processing method is also provided. FIG. 23 shows a schematic flow chart of an image processing method. As shown in FIG. 23, the image processing method at least includes the following steps:

In step 2310, an image to be processed and an image processing requirement are obtained.

In step 2320, the picture to be processed and the image processing requirement are input into the target image processing model in the above methods to obtain an image processing result.

In the methods and apparatuses provided by the example embodiments of the present disclosure, the picture to be processed and the picture requirement are input to the target image processing model in the above methods. Since the target image processing model can be a three-dimensional color look-up model, the present disclosure can avoid the situation in the related art in which an image processing result is based on a one-dimensional color look-up table. Thus, the present disclosure can ensure the accuracy of the image processing result. Also, the present disclosure can meet different picture processing requirements, and expand the application scenarios of image processing.

Steps of the image processing method are explained in detail below.

In step S2310, the image to be processed and the image processing requirement are obtained.

The image to be processed refers to an image that needs to be input into the target image processing model to obtain an image processing result. The image processing requirement refers to a processing requirement corresponding to a problem in the image to be processed. For example, the image to be processed is an unclear image. The image processing requirement can be an image processing requirement of making the image clear.

For example, an image XX to be processed is obtained, and an image processing requirement which is a color correction requirement can be obtained.

In step S2320, the image to be processed and the image processing requirement are input into the target image processing model in the above methods to obtain an image processing result.

The target image processing model in the above methods can be obtained by training a basic look-up model, can be obtained by training a first optimization model, can be obtained by training a second optimization model, can be obtained by training a third optimization model, or can be obtained by training a combined model.

For example, the image XX to be processed and the image processing requirement which is color correction requirement are input into the first optimization model as shown in FIG. 5 to obtain an image processing result.

The model training method for image processing in the embodiments of the present disclosure will be described in detail below in conjunction with an application scenario.

The image processing requirement is to output a super-resolution task with an arbitrary factor of 2.3. At this time, the three-dimensional color look-up model can be the third optimization model as shown in FIG. 16. Based on this, a picture training sample is input into FIG. 16, and the output of the three-optimization model 6 is the image processing result.

In this application scenario, on the one hand, the target image processing model is the result obtained by training a three-dimensional color look-up model. This can avoid a situation in related art in which an image processing result is based on a one-dimensional color look-up table. Thus, the present disclosure can ensure the accuracy of the image processing result. On the other hand, because the three-dimensional color look-up model is three-dimensional, the three-dimensional color look-up model has a larger data capacity than the one-dimensional color look-up table in the related art, the present disclosure can meet different image processing requirements and expand the application scenarios of image processing.

Figure 24:
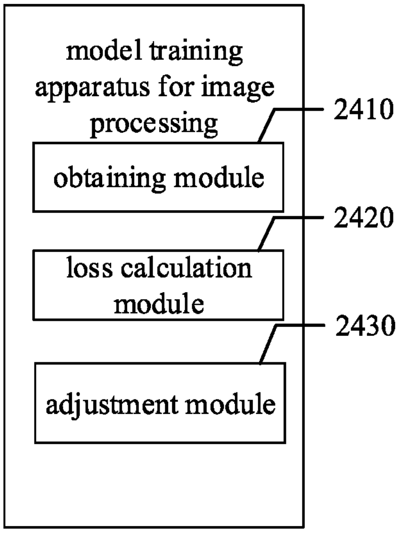
FIG. 24 schematically shows a model training apparatus for image processing in an embodiment of the present disclosure.

In addition, in an example embodiment of the present disclosure, a model training apparatus for image processing is also provided. FIG. 24 shows a schematic structural diagram of an image processing apparatus. As shown in FIG. 24, model training apparatus 2400 for image processing may include an obtaining module 2410, a loss calculation module 2420 and an adjustment module 2430.

The obtaining module 2410 is configured to obtain a picture training sample, and obtain a ground truth picture corresponding to the picture training sample. The loss calculation module 2420 is configured to input the picture training sample into a three-dimensional color look-up model to obtain a model predicted picture, and perform a loss calculation on the model predicted picture and the ground truth picture to obtain a loss calculation result. The adjustment module 2430 is configured to adjust the three-dimensional color look-up model according to the loss calculation result to obtain a target image processing model, where the target image processing model is configured to perform image processing on an image to be processed to obtain an image processing result corresponding to the image to be processed.

Specific details regarding the model training apparatus 2400 for image processing have been described in detail in the corresponding model training methods for image processing, and thus their repeated descriptions are omitted here.

It should be noted that although a plurality of modules or units in the model training apparatus 2400 for image processing are mentioned in the above detailed descriptions, such division is not mandatory. In fact, according to implementations of the present disclosure, the features and functions of two or more modules or units described above may be embodied in one module or unit. Conversely, the features and functions of one module or unit described above may be embodied as being further divided into a plurality of modules or units.

Furthermore, in an example embodiment of the present disclosure, an electronic device capable of implementing the above methods is also provided.

An electronic device 2500 according to an example embodiment of the present disclosure is described below with reference to FIG. 25. The electronic device 2500 shown in FIG. 25 is only an example, and should not be construed as imposing any limitation on the functions and scope of use of the embodiments of the present disclosure.

Figure 25:
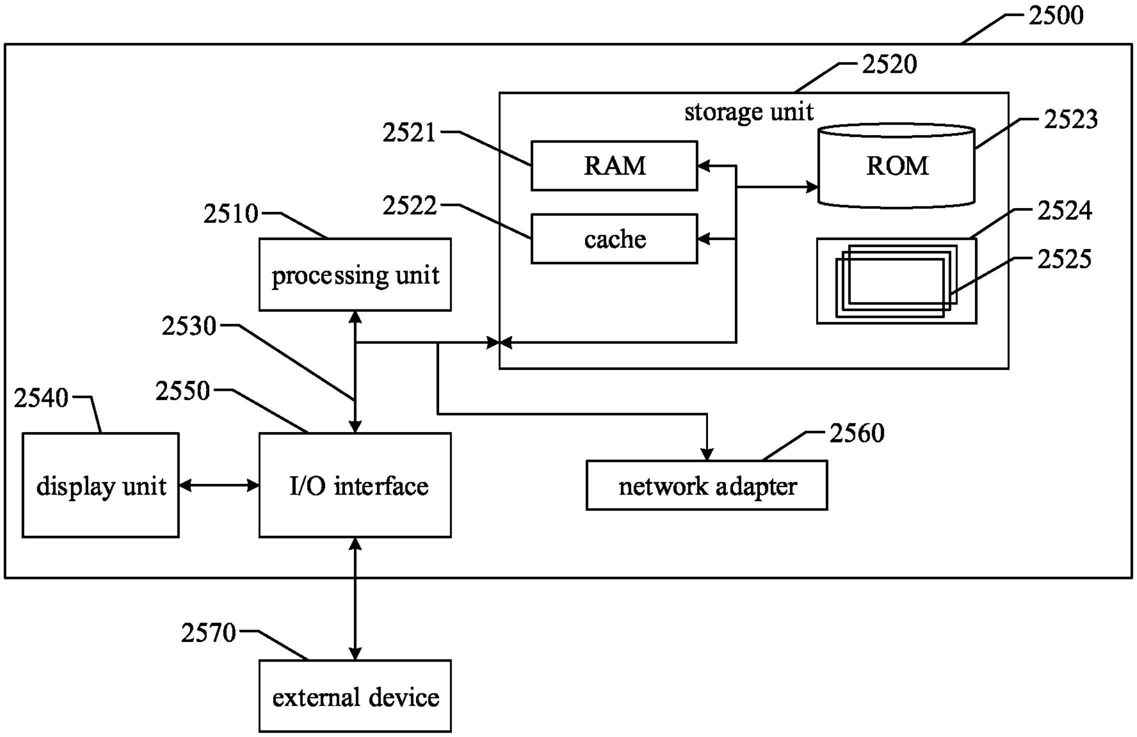
FIG. 25 schematically shows an electronic device for a model training method for image processing in an embodiment of the present disclosure.

As shown in FIG. 25, the electronic device 2500 is shown in the form of a general-purpose computing device. The components of the electronic device 2500 may include, but are not limited to, at least one processing unit 2510, at least one storage unit 2520, a bus 2530 connecting different system components (including the storage unit 2520 and the processing unit 2510) and a display unit 2540.

The storage unit stores program codes, and the program codes can be executed by the processing unit 2510, so that the processing unit 2510 executes steps in the example embodiments of the present disclosure described in the "example methods" section of the specification.

The storage unit 2520 may include a readable medium in the form of a volatile storage unit, such as a random access storage unit (RAM) 2521 and/or a cache storage unit 2522, and may further include a read-only storage unit (ROM) 2523.

The storage unit 2520 may further include a program/utility tool 2524 having a set (at least one) of program modules 2525. Such program modules 2525 include, but are not limited to, an operating system, one or more application programs, other program modules, and program data. Each or some combination of these examples may include an implementation of a network environment.

The bus 2530 may be one or more of several types of bus structures, including a memory unit bus or a memory unit controller, a peripheral bus, a graphics acceleration port, a processing unit, or a local area bus using any bus structure in a variety of bus structures.

The electronic device 2500 may also communicate with one or more external devices 2570 (such as a keyboard, a pointing device, a Bluetooth device, etc.), and may also communicate with one or more devices that enable a user to interact with the electronic device 2500, and/or may also communicate with any device (such as a router, a modem) that can enable the electronic device 2500 to interact with one or more other computing devices. Such communication can be performed through an input/output (I/O) interface 2550. Moreover, the electronic device 2500 may also communicate with one or more networks (such as a local area network (LAN), a wide area network (WAN), and/or a public network, such as the Internet) through the network adapter 2560. As shown in the figure, the network adapter 2560 communicates with other modules of the electronic device 2500 through the bus 2530. It should be understood that although not shown in the figure, other hardware and/or software modules may be used in conjunction with the electronic device 2500, including but not limited to: microcode, device drivers, redundant processing units, external disk drive arrays, RAID systems, tape drives and data backup storage systems.

Through the description of the foregoing embodiments, those skilled in the art can easily understand that the example embodiments described herein can be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network. The software product may include instructions to cause a computing device (which may be a personal computer, a server, a terminal device, or a network device, etc.) to execute the methods according to example embodiments of the present disclosure.

An example embodiment of the present disclosure also provides a computer-readable storage medium having stored thereon a program product capable of implementing the above methods according to embodiments of the present disclosure. In some possible embodiments, aspects of the present disclosure may also be implemented in the form of a program product, which includes program codes. When the program product is run on a terminal device, the program codes are used to cause the terminal device to perform the steps according to various example embodiments of the present disclosure described in the above-mentioned exemplary methods.

Figure 26:
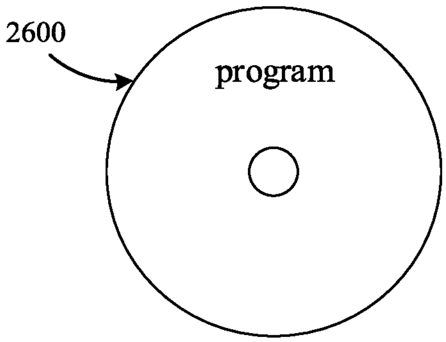
FIG. 26 schematically shows a non-transitory computer-readable storage medium for a model training method for image processing in an embodiment of the present disclosure.

FIG. 26 shows a program product 2600 for implementing the above methods according to an example embodiment of the present disclosure. The program product 2600 may employ a portable compact disc read-only memory (CD-ROM) and include program codes, and may be run on a terminal device, such as a personal computer. However, the program product of the present disclosure is not limited thereto. The readable storage medium may be any tangible medium containing or storing a program, and the program may be used by an instruction execution system, apparatus, or device, or the program may be used in combination with an instruction execution system, apparatus, or device.

The program product may employ any combination of one or more readable mediums. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive examples) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as part of a carrier wave, which carries readable program codes. Such a propagated data signal may have many forms, including but not limited to electromagnetic signals, optical signals, or any suitable combination of the foregoing. The readable signal medium may also be any readable medium other than a readable storage medium, and the readable medium may send, propagate, or transmit a program that is used by an instruction execution system, apparatus, or device, or that is used in combination with an instruction execution system, apparatus, or device.

The program codes contained on the readable medium may be transmitted using any appropriate medium, including but not limited to wireless, wired, optical fiber. RF, etc., or any suitable combination of the foregoing.

The program codes for performing the operations of the present disclosure can be written in any combination of one or more programming languages, which include object-oriented programming languages, such as Java, C++, and so on. The programming languages also include conventional procedural programming language, such as "C" or a similar programming language. The program codes can be executed entirely on the user computing device, can be executed partly on the user device, can be executed as an independent software package, can be executed partly on the user computing device and partly on a remote computing device, or can be executed entirely on the remote computing device or server. In the case of a remote computing device, the remote computing device can be connected to the user computing device through any kind of network, including a local area network (LAN) or a wide area network (WAN), or the remote computing device can be connected to an external computing device, for example, by the Internet provided by the Internet service providers.

Those skilled in the art will readily contemplate other embodiments of the present disclosure after considering the specification and practicing the disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only.

What is claimed is:

1. A model training method for image processing, comprising:

obtaining a picture training sample, and obtaining a ground truth picture corresponding to the picture training sample;

inputting the picture training sample into a three-dimensional color look-up model to obtain a model predicted picture, and performing loss calculation on the model predicted picture and the ground truth picture to obtain a loss calculation result; and adjusting the three-dimensional color look-up model according to the loss calculation result to obtain a target image processing model, wherein the target image processing model is configured to perform image processing on an image to be processed to obtain an image processing result corresponding to the image to be processed;

wherein the three-dimensional color look-up model comprises a first optimization model, the first optimization model comprises a combination of one basic look-up model and a first derived model, and the first derived model comprises a weight model and a plurality of basic look-up models;

wherein inputting the picture training sample into the three-dimensional color look-up model to obtain the model predicted picture comprises:

inputting the picture training sample into the weight model to extract a picture feature corresponding to the picture training sample;

determining weight values, which correspond to the plurality of basic look-up models in the first derived model, respectively, according to the picture feature;

updating a plurality of basic color mapping relationships corresponding to the plurality of basic look-up models in the first derived model according to the weight values which correspond to the plurality of basic look-up models in the first derived model, respectively, and performing calculation on an update result to obtain a first derived color mapping relationship corresponding to the first derived model;

determining a first optimization color mapping relationship corresponding to the first optimization model, based on a combination relationship corresponding to the combination of the basic look-up model and the first derived model of the first optimization model, the first derived color mapping relationship, and a basic color mapping relationship corresponding to the one basic look-up model in the first optimization model; and according to the first optimization color mapping relationship, determining a model predicted picture corresponding to the picture training sample.

2. The model training method for image processing according to claim 1, wherein a linear combination relationship exists between the one basic look-up model and the first derived model in the first optimization model;

wherein adjusting the three-dimensional color look-up model according to the loss calculation result to obtain the target image processing model, comprises:

in response to that the linear combination relationship exists between the one basic look-up model and the first derived model in the first optimization model, according to the loss calculation result, adjusting the weight values which correspond to the plurality of basic look-up models in the first derived model, respectively, and the basic color mapping relationships corresponding to the basic look-up models in the first derived model, to obtain the target image processing model.

3. The model training method for image processing according to claim 1, wherein a product combination relationship exists between the one basic look-up model and the first derived model in the first optimization model;

wherein adjusting the three-dimensional color look-up model according to the loss calculation result to obtain the target image processing model, comprises:

in response to that the product combination relationship exists between the one basic look-up model and the first derived model in the first optimization model, adjusting the weight values which correspond to the plurality of basic look-up models in the first derived model, respectively, and a plurality of basic color mapping relationships corresponding to the plurality of basic look-up models in the first derived model, to obtain a training result corresponding to the first derived model; and when the training result meets a training end condition, training the first optimization model according to the loss calculation result to obtain the target image processing model.

4. The model training method for image processing according to claim 1, wherein the weight model comprises a picture size fixing layer, a plurality of sampling layers and an output layer which are connected in order, the picture size fixing layer is used to fix a size of the picture training sample, the sampling layers are used to extract the picture feature corresponding to the picture training sample, and the output layer is used to determine, according to the picture feature, the weight values which correspond to the plurality of basic look-up models in the first derived model, respectively.

5. The model training method for image processing according to claim 1, wherein the three-dimensional color look-up model comprises a combined model, and the combined model comprises two first optimization models;

wherein a combination relationship of one of the first optimization models in the combined model is a linear combination relationship, and a combination relationship of the other one of the first optimization models in the combined model is a product combination relationship.

6. The model training method for image processing according to claim 1, wherein the three-dimensional color look-up model comprises a basic look-up model;

wherein inputting the picture training sample into the three-dimensional color look-up model to obtain the model predicted picture, comprises:

inputting the picture training sample into the basic look-up model, wherein the basic look-up model is used to determine a pixel color value in the picture training sample, and determine a target pixel color value that has a basic color mapping relationship with the pixel color value; and determining a target pixel corresponding to the target pixel color value, and determining a picture formed by the target pixel as the model predicted picture.

7. An image processing method, comprising:

obtaining an image to be processed and an image processing requirement; and inputting the image to be processed and the image processing requirement into the target image processing model according to claim 1 to obtain an image processing result.

8. The model training method for image processing according to claim 5, wherein the three-dimensional color look-up model comprises one third optimization model or a plurality of third optimization models, and the third optimization models are any one of the basic look-up model, the first optimization model, a second optimization model and the combined model, and the second optimization model comprises a combination of a plurality of second derived models and one basic look-up model;

wherein inputting the picture training sample into the three-dimensional color look-up model to obtain the model predicted picture, comprises:

obtaining a plurality of down-sampling factors, and sampling the picture training sample according to the plurality of down-sampling factors to obtain a plurality of down-sampling results, wherein the down-sampling factors comprise integer factors;

determining at least one up-sampling factor according to a picture processing requirement, and sampling the picture training sample according to the at least one up-sampling factor to obtain at least one up-sampling result, wherein the at least one up-sampling factor comprises a decimal factor;

inputting the down-sampling results into the one third optimization model or the plurality of third optimization models to obtain first model output results corresponding to the down-sampling results;

inputting the at least one up-sampling result into the one third optimization model or the plurality of third optimization models to obtain a second model output corresponding to the at least one up-sampling result;

comparing a magnitude of the at least one up-sampling factor to obtain a first factor comparison result, and comparing magnitudes of the down-sampling factors to obtain a second factor comparison result; and based on the first factor comparison result and the second factor comparison result, determining an input-output relationship between the first model output results and the second model output result, so as to obtain the model predicted picture based on the input-output relationship.

9. The model training method for image processing according to claim 8, wherein the method further includes:

inputting the picture training sample into a model to be learned to obtain a ground truth picture corresponding to the picture training sample, wherein the model to be learned comprises any one of the basic look-up model, the first optimization model, the second optimization model, the third optimization model and an open source model;

inputting the picture training sample into a target optimization model to obtain the model predicted picture, wherein the target optimization model comprises any one of the basic look-up model, the first optimization model, the second optimization model and the combined model; and performing loss calculation on the model predicted picture and the ground truth picture to adjust the target optimization model according to a loss calculation result to obtain the target optimization model with a same function as the model to be learned.

10. A model training apparatus for image processing, comprising:

a processor; and a memory configured to store instructions executable by the processor;

wherein the processor is configured to execute the executable instructions to:

obtain a picture training sample, and obtain a ground truth picture corresponding to the picture training sample;

input the picture training sample into a three-dimensional color look-up model to obtain a model predicted picture, and perform loss calculation on the model predicted picture and the ground truth picture to obtain a loss calculation result; and adjust the three-dimensional color look-up model according to the loss calculation result to obtain a target image processing model, wherein the target image processing model is configured to perform image processing on an image to be processed to obtain an image processing result corresponding to the image to be processed;

wherein the three-dimensional color look-up model comprises a first optimization model, the first optimization model comprises a combination of one basic look-up model and a first derived model, and the first derived model comprises a weight model and a plurality of basic look-up models;

wherein the processor is configured to:

input the picture training sample into the weight model to extract a picture feature corresponding to the picture training sample;

determine weight values, which correspond to the plurality of basic look-up models in the first derived model, respectively, according to the picture feature;

update a plurality of basic color mapping relationships corresponding to the plurality of basic look-up models in the first derived model according to the weight values which correspond to the plurality of basic look-up models in the first derived model, respectively, and perform calculation on an update result to obtain a first derived color mapping relationship corresponding to the first derived model;

determine a first optimization color mapping relationship corresponding to the first optimization model, based on a combination relationship corresponding to the combination of the basic look-up model and the first derived model of the first optimization model, the first derived color mapping relationship, and a basic color mapping relationship corresponding to the one basic look-up model in the first optimization model; and according to the first optimization color mapping relationship, determine a model predicted picture corresponding to the picture training sample.

11. The model training apparatus for image processing according to claim 10, wherein a linear combination relationship exists between the one basic look-up model and the first derived model in the first optimization model;

wherein when the executable instructions are executed by the processor, the processor is caused to:

in response to that the linear combination relationship exists between the one basic look-up model and the first derived model in the first optimization model, according to the loss calculation result, adjust the weight values which correspond to the plurality of basic look-up models in the first derived model, respectively, and the basic color mapping relationships corresponding to the basic look-up models in the first derived model, to obtain the target image processing model.

12. A non-transitory computer readable storage medium on which a computer program is stored, wherein when the computer program is executed by a processor, a model training method for image processing is implemented;

wherein the model training method comprises:

obtaining a picture training sample, and obtaining a ground truth picture corresponding to the picture training sample;

inputting the picture training sample into a three-dimensional color look-up model to obtain a model predicted picture, and performing loss calculation on the model predicted picture and the ground truth picture to obtain a loss calculation result; and adjusting the three-dimensional color look-up model according to the loss calculation result to obtain a target image processing model, wherein the target image processing model is configured to perform image processing on an image to be processed to obtain an image processing result corresponding to the image to be processed;

wherein the three-dimensional color look-up model comprises a first optimization model, the first optimization model comprises a combination of one basic look-up model and a first derived model, and the first derived model comprises a weight model and a plurality of basic look-up models;

wherein inputting the picture training sample into the three-dimensional color look-up model to obtain the model predicted picture comprises:

inputting the picture training sample into the weight model to extract a picture feature corresponding to the picture training sample;

determining weight values, which correspond to the plurality of basic look-up models in the first derived model, respectively, according to the picture feature;

updating a plurality of basic color mapping relationships corresponding to the plurality of basic look-up models in the first derived model according to the weight values which correspond to the plurality of basic look-up models in the first derived model, respectively, and performing calculation on an update result to obtain a first derived color mapping relationship corresponding to the first derived model;

determining a first optimization color mapping relationship corresponding to the first optimization model, based on a combination relationship corresponding to the combination of the basic look-up model and the first derived model of the first optimization model, the first derived color mapping relationship, and a basic color mapping relationship corresponding to the one basic look-up model in the first optimization model; and according to the first optimization color mapping relationship, determining a model predicted picture corresponding to the picture training sample.

* * * * *